US011822612B2

(12) United States Patent
Jia et al.

(10) Patent No.: US 11,822,612 B2
(45) Date of Patent: Nov. 21, 2023

(54) AUTOMATIC IDENTIFICATION OF ADDITIONAL CONTENT FOR WEBPAGES

(71) Applicant: Microsoft Technology Licensing, LLC, Redmond, WA (US)

(72) Inventors: Yu Jia, Kirklans, WA (US); Xiaodong Fan, Bellevue, WA (US); Guihong Cao, Bellevue, WA (US); Innocent Mutabazi Ndimubanzi, Bothell, WA (US); Zicheng Huang, Bothell, WA (US); Yufei Zhong, Redmond, WA (US); Astha Suneja, Redmond, WA (US); Jun Liu, Bellevue, WA (US); Alyssa Nicole Ricken, Seattle, WA (US); Eugene J So, Redmond, WA (US); Julian Manuel Varanda, Seattle, WA (US)

(73) Assignee: Microsoft Technology Licensing, LLC

( * ) Notice: Subject to any disclaimer, the term of this patent is extended or adjusted under 35 U.S.C. 154(b) by 0 days.

(21) Appl. No.: 17/556,989

(22) Filed: Dec. 20, 2021

(65) Prior Publication Data

US 2023/0125087 A1 Apr. 27, 2023

Related U.S. Application Data

(60) Provisional application No. 63/270,459, filed on Oct. 21, 2021.

(51) Int. Cl.
*G06F 16/957* (2019.01)
*G06F 3/0482* (2013.01)
*G06F 3/04855* (2022.01)

(52) U.S. Cl.
CPC ........ *G06F 16/9577* (2019.01); *G06F 3/0482* (2013.01); *G06F 3/04855* (2013.01); *G06F 2203/04803* (2013.01)

(58) Field of Classification Search
CPC . G06F 16/9577; G06F 3/0482; G06F 3/04855
See application file for complete search history.

(56) References Cited

U.S. PATENT DOCUMENTS

2002/0143659 A1* 10/2002 Keezer ............... G06Q 30/0641
707/E17.116
2006/0036966 A1* 2/2006 Yevdayev ............. G06F 16/951
715/779

(Continued)

FOREIGN PATENT DOCUMENTS

WO WO-2012073037 A2 * 6/2012 ....... G06F 17/30876
WO 2013067462 A1 5/2013
WO 2018217402 A1 11/2018

OTHER PUBLICATIONS

"Black Bear", Retrieved from: https://web.archive.org/web/20211118204548/https://defenders.org/wildlife/black-bear, Nov. 18, 2021, 5 Pages.

(Continued)

*Primary Examiner* — Asher D Kells
(74) *Attorney, Agent, or Firm* — RAY QUINNEY & NEBEKER P.C.; Paul N. Taylor

(57) ABSTRACT

The present disclosure relates to systems and methods for automatically identifying additional content for a webpage. The systems and methods may create a side pane placed next to a webpage to supplement the webpage in a browser. The side pane may provide additional information or additional content to help users consume the webpage. The additional content may provide webpage insights and help the users further explore the webpage.

23 Claims, 16 Drawing Sheets

(56) References Cited

U.S. PATENT DOCUMENTS

| | | | |
|---|---|---|---|
| 2007/0250468 A1* | 10/2007 | Pieper | G06F 16/9535 |
| 2009/0106201 A1* | 4/2009 | White | G06F 16/958 |
| 2010/0169364 A1* | 7/2010 | Hardt | G06F 16/95 707/769 |
| 2011/0078615 A1* | 3/2011 | Bier | G06F 9/451 715/779 |
| 2011/0252060 A1* | 10/2011 | Broman | G06F 16/957 707/E17.112 |
| 2011/0252329 A1* | 10/2011 | Broman | G06F 16/951 715/738 |
| 2011/0252342 A1* | 10/2011 | Broman | G06F 16/957 715/760 |
| 2013/0066814 A1* | 3/2013 | Bosch | G06F 16/353 706/12 |
| 2014/0372563 A1* | 12/2014 | Ke | H04L 41/0246 709/218 |
| 2018/0246983 A1 | 8/2018 | Rathod | |
| 2018/0341716 A1* | 11/2018 | Iyer | G06F 16/437 |
| 2019/0114056 A1* | 4/2019 | Gandhi | G06F 3/04842 |
| 2020/0351314 A1 | 11/2020 | Butcher et al. | |

OTHER PUBLICATIONS

"Seattle Seahawks", Retrieved from: https://en.wikipedia.org/wiki/Seattle_Seahawks, Dec. 8, 2021, 30 Pages.

Fitch, Chris, "Under A White Sky: The Nature of the Future by Elizabeth Kolbert Book Review", Retrieved from: https://geographical.co.uk/reviews/books/item/4027-under-a-white-sky-the-nature-of-the-future-by-elizabeth-kolbert-book-review, Apr. 29, 2021, 13 Pages.

Goodson, Amy, "Halibut Fish: Nutrition, Benefits and Concerns", Retrieved from: https://web.archive.org/web/20210516150156/https://www.healthline.com/nutrition/halibut-fish, May 16, 2021, 19 Pages.

Rodgers, Michael, "Is the Oculus VR headset worth it?", Retrieved from: https://www.chicagotribune.com/consumer-reviews/sns-bestreviews-tech-oculus-vr-headset-worth-it-20210507-xee2kewkpjfmbfi43eoydagkgy-story.html, May 7, 2021, 8 Pages.

Todd, Carolyn L., "Long COVID Symptoms Are Common—Even After Mild or Asymptomatic Cases, New Study Shows", Retrieved from: https://www.msn.com/en-us/health/medical/long-covid-symptoms-are-common-even-after-mild-or-asymptomatic-cases-new-study-shows/ar-AAL9X8z, Jun. 17, 2021, 6 Pages.

Woodrow, Christy, "Yellowstone National Park Camping Tips", Retrieved from: https://web.archive.org/web/20210306231750/https://ordinarytraveler.com/tipsarticles/tips-hiking-camping-yellowstone-national-park, Mar. 6, 2021, 38 Pages.

"International Search Report and Written Opinion Issued in PCT Application No. PCT/US22/044472", dated Jan. 25, 2023, 11 Pages.

* cited by examiner

AUTOMATIC IDENTIFICATION OF ADDITIONAL CONTENT FOR WEBPAGES

CROSS-REFERENCE TO RELATED APPLICATIONS

This application claims priority to and the benefit of U.S. Provisional Patent Application No. 63/270,459, filed on Oct. 21, 2021, which is hereby incorporated by reference in its entirety.

BACKGROUND

Users engage with browsers for content discovery, for example, by viewing different webpages or watching multimedia content (photos, videos, images). Users also engage with browsers to perform end-to-end task completions (e.g., performing a search query for a topic and finding relevant content or answers for the topic, or searching for a product and purchasing a product). Currently, when a user is viewing a webpage on a browser, the browser does not provide solutions to assist the user in understanding the current web page's content.

BRIEF SUMMARY

The present disclosure describes systems and methods for identifying additional content for a webpage. For example, in response to a user accessing a webpage with an article on a virus, the system may identify additional content to present in a side pane adjacent to the webpage. The additional content may include a summary of the article with the key points of the article so that the user may read the key points of the article to get an understanding of the content of the webpage. The side pane may remain in view of the webpage with the article on the virus. As described in greater detail below, the additional content may be identified based on the content or context of the webpage being accessed by the user. The additional content may also include content derived from the webpage (e.g., information from the article). In this way, the system presents additional content in a side pane that helps the user consume the webpage or supplement the webpage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method for automatically identifying additional content for a webpage. The method may include receiving a request for additional content for the webpage, wherein the request includes a uniform resource locator (URL) of the webpage. The method may include classifying the URL of the webpage. The method may include triggering a side pane experience for the additional content based on the classification of the webpage. The method may include aggregating additional content obtained from one or more data sources for the side pane experience, wherein the additional content is obtained based on a context of the webpage. The context of the webpage includes the content of the webpage. The method may include sending the additional content to a browser to be presented in a side pane adjacent to the webpage. The method improves user efficiency by organizing and arranging the additional content into modules. In addition, the method reduces the need for users to navigate to multiple websites, and thus, reduce user inputs and/or clicks.

Another example implementation relates to a method for presenting additional content for a webpage. The method may include identifying a uniform resource locator (URL) of a webpage accessed by a browser. The method may include sending a request for additional content, wherein the request includes the URL of the webpage. The method may include receiving the additional content, wherein the additional is based on a context of the webpage. The method may include presenting the additional content in a side pane next to the webpage.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 6 illustrates an example graphical user interface of a browser displaying a webpage and a side pane including a knowledge card module in accordance with implementations of the present disclosure.

FIG. 8 illustrates an example graphical user interface of a browser displaying a webpage and a side pane including a recommended content module in accordance with implementations of the present disclosure.

DETAILED DESCRIPTION

Figure 1:
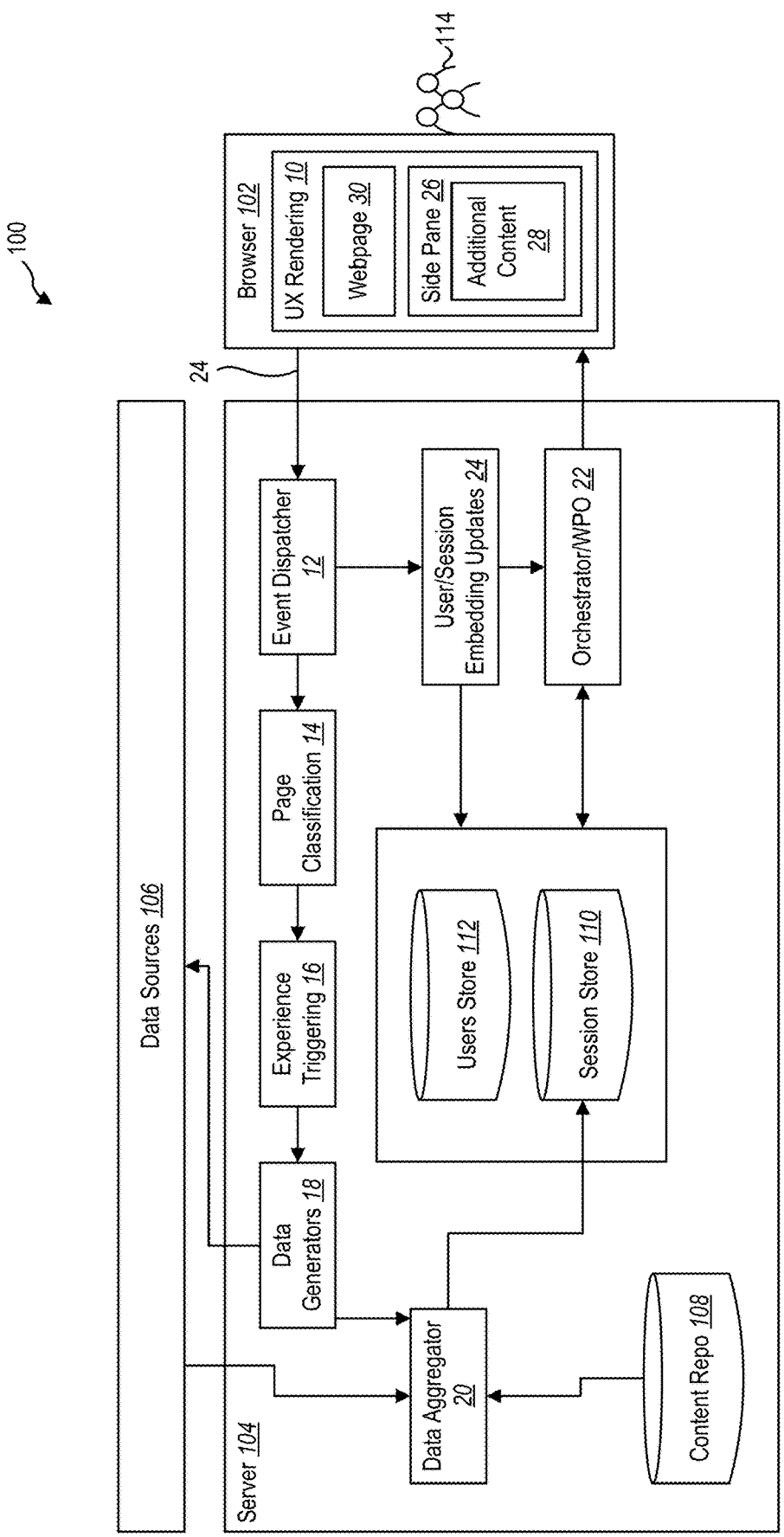
FIG. 1 illustrates an example environment for identifying and presenting additional content for a webpage in accordance with implementations of the present disclosure.

This disclosure generally relates to identifying additional content for a webpage currently being viewed or engaged with by a user. Users engage with browsers for content discovery, for example, by viewing different webpages or watching multimedia content (photos, videos, images). Users also engage with browsers to perform end-to-end task completions (e.g., performing a search query for a topic and finding relevant content or answers for the topic, or searching for a product and purchasing a product). Currently, when a user is viewing a webpage on a browser, the browser does not provide solutions to assist the user in understanding the current web page's content.

The systems and methods of the present disclosure help users complete end-to-end tasks while browsing all sorts of web pages without breaking the users' current workflow. The present invention provides webpage insights, such as, a webpage summary, webpage topics, identifying or providing key entities that help users consume the current webpage's content, and/or recommending contextual or personalized content (e.g., related articles for users to further explore).

The systems and methods of the present disclosure provide users, a contextual and personalized feed with additional content relevant to the content that the users are currently consuming. The present disclosure assists users to better understand the currently viewed content and helps users explore related content. In addition, the present disclosure enables users to interact with the viewed content or with users with similar interests.

The systems and methods of the present disclosure create a side pane that may be placed on the right side of a browser to supplement a webpage that a user is viewing. The side pane provides additional information and/or additional content to the user to help the user consume the current webpage the user is browsing using the browser. The side pane remains with the main view of the webpage.

The side pane may be positioned at the right rail of the browser with a contextualized and/or a personalized feed of additional content. The side pane is opened either reactively by the user or proactively by an algorithm as a companion canvas for the user's currently browsed webpage. The contextualized and/or personalized feed may be organized into different tabs or modules.

An example use case is a user viewing webpage for a book. An example tab or module shown in the side pane includes an on this page module that shows a short passage as a webpage summary followed by a list of salient topics, entities, and key phrases extracted from the webpage as its overview, frequently asked questions (FAQs) about the webpage content, as well as the webpage view count and social reactions (number of likes, loves, surprised, etc.) to illustrate the webpage popularity. As the webpage is about a book, the present disclosure may also present a rich knowledge card of the book in the side pane so that interested users can learn more about the book, read its reviews, and/or purchase the book. Another example tab or module shown in the side pane includes a more for you module that returns a feed of related articles, questions and answers (e.g., about the book in the webpage, the author, her Pulitzer Prize, climate changes, etc.), related videos/images (such as book trailer, cover images, etc.), related entities (other books by the author, about climate changes, on a summer reading list, etc.), and link(s) or suggested queries for related searches for users to explore more. In some implementations, selecting a link or suggested query causes the corresponding search results to be displayed in the side pane. Another example table or module shown in the side pane includes an 'about the source' module that provides the website description of the magazine that published the webpage on the book, website quality (e.g., quality in terms of spam, junk, adult, or malware detection), and a list of similar websites. The side pane may also show the topic authority information of the website, user traffic trend of the webpage, and its incoming links, to help the users evaluate the trustworthiness of the source. Another example table or module shown in the side pane includes a user generated content module that allows the users to write reviews of the book, as well as ask and answer questions about the book and the author.

As such, the systems and methods of the present disclosure provide webpage insights, such as, page summary, page topics, and/or key entities that help the users consume the current webpage's content and recommend contextual or personalized content (related articles) for the users to further explore. The personalized content is based on the context that the user is browsing to help keep the user engaged in the browsing session. The personalized content may also include user generated content (e.g., comments on the webpage).

The systems and methods of the present disclosure may open the side pane reactively based on the user's input. The user may click on a toolbar icon on the browser and, in response to the user clicking the toolbar icon, the side pane may open with the additional content (e.g., the recommended contextual or personalized content). The toolbar icon may be enabled all the time. As such, anytime the user is browsing webpages using the browser, the user may be able to click on the toolbar icon.

The additional content presented in the side pane may be based on the context of the webpage currently being browsed by the user. The context of the webpage includes the content of the webpage. The systems and methods search for related materials and optionally filters out results that are the same as what is already in the webpage content. In addition, the additional content may include content derived from the web page. For example, one or more machine learning models may identify the content on the webpage and present the content of the webpage as the additional content in the side pane.

The side pane may have one or more modules highlighting the additional content. The modules of the side pane may help the user consume the content, help the user explore additional content, and/or help keep the user engaged in the browsing experience. The additional content presented in the side pane may come from a plurality of sources. For example, if the webpage has a primary entity (e.g., Seattle Seahawks), an entity card for the primary entity may be presented in the side pane with an aggregation of content from a plurality of sources.

The modules on the side pane may include default modules (e.g., overview module, source module, explore module). The overview module may include a plurality of modules (e.g., the key points in the webpage, webpage topics, questions and answers) that help users consume the webpage. The overview module may also have a see more button where the user may browse additional content related to the webpage.

The key points module of the side pane may help the user review the key takeaways from an article on the webpage. In addition, if the user is in a hurry, the user may skip reading the full content of the webpage and go directly to the key points to get an understanding of the content of the webpage.

The webpage topics module of the side pane may be generated by machine learning models reviewing the content of the webpage and associate the content of the webpages to topics mentioned in the webpage or topics related to the content mentioned in the webpage. The user can click on the topics and perform a search in the side pane for the topic selected (e.g., the phrase for the topic selected is automatically inputted as a search term and a search is performed on the selected topic). The search results are provided in the side pane and the user may browse the search results for the topic selected in the side pane while keeping the webpage that the user is currently browsing in the left pane.

The question and answer module of the side pane may include a plurality of questions generated by a machine learning model with answers provided by content provided by the webpage.

The side pane may also have an explore module that helps the user continue to explore and be inspired based on the content of the webpage. The explore module may provide content recommendations related to the current webpage based on the context of the current webpage. The personalized content module may personalize the content provided based on the user's behavior and/or past user interactions with the browser.

If the webpage is private (e.g., bank login page) and the machine learning models are unable to identify the content of the webpage, the explore module may present personalized content based on the user's past behaviors interacting with the browser. The user's interactions with the browser may include, for example, selecting banners on the webpage, webpages viewed, and/or previous search topics. The content presented may be personalized based on previous search interests (sports, health, do it yourself (DIY)).

The side pane may also have an 'about the source' module that provides information about the source of the webpage (a disclaimer of the source, a description of the source, quick links that the user can continue to browse).

The modules included in the side pane may vary based on the domain of the webpage. For example, news, finance, shopping, weather, maps, sports, shopping, cooking, and travel domains may include different modules in the side pane. One example module for a sports webpage or news webpage includes an entity module. If the webpage has a primary entity (e.g., Seattle Seahawks), an entity card for the primary entity may be presented in the side pane with an aggregation of content from a plurality of sources.

Another example module for a travel webpage may include an explore module that allows users to explore contextual recommendations for a location based on the content of the webpage the user is viewing or a search performed by the user (e.g., hotels in a location, search for flights for a location, recommendations for car rentals, recommendations for attractions or restaurants, and/or a map for the location with attractions or restaurants in the location highlighted).

Another example includes for a cooking webpage, the modules include information about the recipe mentioned in the cooking webpage (e.g., ingredients, cooking time, service portions) and/or modules with related recipes to the recipe mentioned in the cooking webpage.

The user may open any of the modules of the side pane in a new tab. In addition, the user may resize the side pane by increasing and/or decreasing the size of the side pane.

In an implementation, the side pane is presented automatically. The side pane may be presented automatically based on domain or category of a webpage that the user accessed. For example, a subset of webpage a uniform resource locators (URLs) (e.g., cooking, travel, sports) may automatically trigger the side pane to display in the browser adjacent to or next to the webpage that the user selected.

The side pane may also include a search input where the user may input search terms for a query and the search results for the query may surface within the side pane. As such, the user may run multiple searches in the side pane while viewing a webpage.

The systems and methods of the present disclosure may be used as a reading assistant and a content discovery engine. The present disclosure leverages natural language understanding, machine reaching comprehension, and personalized recommendation techniques to make content relevant to a users' current tasks and long-term interests. In some implementations, the present disclosure is a companion browser with a mobile screen size run side-by-side the main browser to proactively provide relevant information and enable further explorations without taking the users out of the current task workflow.

The systems and methods of the present disclosure are easily accessible regardless of the websites that the users are browsing and provides content aggregated across the entire World Wide Web, which is an advantage over other content services that create data silos.

One technical advantage of some implementations of the systems and methods of the present disclosure is providing additional content powered by a browser, and thus, user engagement with the browser may increase. In addition, the systems and methods improve user efficiency by organizing and arranging the additional content into modules. The systems and methods also reduce the need for users to navigate to multiple websites, and thus, reduce user inputs and/or clicks. The systems and methods also improve trust of the users as several of the modules allow the users to understand the source and reputation of the websites. Moreover, the systems and methods improve the accessibility of websites that do not otherwise have good accessibility options.

As such, the systems and methods of the present disclosure provide a companion canvas that gives users insight on the current viewed web document, enables in-depth exploration of the current topic, suggestion of new topics, understanding of various perspectives, and/or offers other in-context experiences to the users.

Referring now to FIG. 1, illustrated is an example environment 100 for identifying and presenting additional content for a webpage. The environment 100 may include one or more users 114 interacting with one or more browsers 102 on a device. The browsers 102 allow the users 114 to interact with information on the World Wide Web. When a user 114 requests a webpage 30 from a website (e.g., by performing a search using the browser 102 or entering in a uniform resource locator (URL) of a website using the browser 102), the browser 102 retrieves the content of the webpage 30 from a webserver and displays the webpage 30 on a display of the user's device. The webpage 30 may be any webpage (third party webpages or webpages from the same party that provides the browser 102). In addition, the browser 102 may be a browser application on a device of the user 114. Examples of browsers 102 include, but are not limited to, EDGE™ and INTERNET EXPLORER™.

The browser 102 may have a user interface rendering component 10 that presents the requested webpage 30 on the display. The user interface rendering component 10 may also present a side pane 26 with additional content 28 for the requested webpage 30. The side pane 26 may be presented next to or adjacent to the webpage 30. For example, the side pane 26 is presented by the user interface rendering component 10 on a right side of the requested webpage 30. In some implementations, the browser 102 provides a notification to the user 114 to inform the user 114 that there may be additional content 28 for the requested webpage 30 that may be of interest to the user. Notification may identify the icon or button on the browser 102 that the user 114 may click to receive the side pane 26 with the additional information.

The users 114 may select an icon or button on the browser 102 to trigger the presentation of the side pane 26 with the additional information and/or the additional content 28. The browser 102 may send a request 24 to a runtime server 104 for the additional content 28 to present in the side pane 26 and the user interface rendering component 10 may present the side pane 26 with the received additional content 28. The browser 102 may send the request 24 for the additional content 28 and the user interface rendering component 10 may present the side pane 26 with the additional content 28 based on a reactive trigger (e.g., the user 114 clicking on a button).

In addition, the browser 102 may automatically send the request 24 to the runtime server 104 for the additional content 28 and the user interface rendering component 10 may automatically present the side pane 26 with the received additional content 28 on the browser 102 in response to the user opening the webpage URL. Thus, the presentation of the side pane 26 on the browser 102 with the additional content 28 may be triggered reactively (e.g., by the user 114 selecting an icon or button) or proactively (e.g., automatically upon the user opening a webpage URL).

The runtime server 104 may be a search engine that aggregates and returns related and useful content with respect to the webpage 30 opened on the browser 102 by the user 114. The runtime server 104 provides a single endpoint for the browsers 102 to connect with by aggregating the different data sources 106 for the additional content 28 to present in the side pane 26. The runtime server 104 also organizes the whole page experience for the side pane 26 and handles the user 114 interactions with the side pane 26.

The input to the runtime server 104 is different from a traditional search engine, where the input from the user 114 is a query. The runtime server 104 receives the URL of the webpage 30 requested by the user 114 as input and may also receive the user interactions on the side pane 26 (e.g., selecting a topic of interest to view additional content) as input.

The runtime server 104 may include an event dispatcher component 12 that receives the request 24 from the browser 102 with the URL of the webpage 30. The event dispatcher component 12 determines whether the request 24 is new request (e.g., a new webpage opened by the user 114) or the request 24 is a user interaction of a side pane 26 by the user 114.

If the request 24 is a new request (e.g., for a newly accessed webpage), the event dispatcher component 12 sends the request 24 with the URL of the webpage 30 to a page classification component 14. The page classification component 14 runs a URL classification of the URL of the webpage 30 and determines whether to trigger the side pane 26 based on the URL classification. Whether to trigger the side pane 26 may be a rule based triggering (e.g., triggering based on a list of URLs or domains) or custom triggering (e.g., based on partner services). The URL classification may determine whether the URL of the webpage 30 is a private domain or a public domain. In addition, the URL classification determines a domain of the webpage 30 (e.g., sports, travel, cooking, news, medical, etc.).

If the classification identifies the URL as a private webpage 30, the page classification component 14 may prevent the presentation of the side pane 26 with the additional content based on the private webpage classification. In addition, if the classification identifies the URL in a domain that is included on a list of domains to block or prevent the presentation of the side pane 26 (e.g., offensive domains, adult content domains, spam domains), the page classification component 14 may prevent the presentation of the side pane 26 with the additional content 28 based on the domain of the webpage 30. The page classification component 14 may have one or more machine learning models that perform the URL classification and the determination whether to trigger the presentation of the side pane 26 with the additional content 28. As such, the page classification component 14 may determine whether to trigger the side pane 26 with the additional content 28 based on the classification of the URL of the webpage 30.

The page classification component 14 may communicate with the experience triggering component 16 to determine a side pane experience for the additional content 28 based on the classification. The experience triggering component 16 may determine one or more modules and/or experience levels to provide the additional content 28 in the side pane 26. Different modules and/or experiences may be presented based on the classification of the webpage 30. For example, the experience triggering component 16 may select different modules for different webpage domains.

The selection of the side pane experience may be a rule based triggering (e.g., triggering a selection of different modules based on a list of URLs or domains). A generic experience may be triggered (e.g., a set of predefined modules may be presented in the side pane) for the webpage 30, or a domain specific experience may be triggered (e.g., a specific set of modules are selected for presentation in the side pane) based on the domain of the webpage 30. Example modules include, but are not limited to, a summary module, a questions and answer module, a recommended content module, a personalized content module, a page overview module, an explore module, a topics module, a key points module, a knowledge card module, a source module, a cooking module, a food module, a travel module, a shopping module, and/or a books module.

For example, knowledge card module triggering is decided by the dominant entity stamping result for the webpage 30 and a page summary module triggering is based on whether the original webpage deserves a summary and whether the summary will be helpful to the end user 114. Another example for a cooking webpage includes modules with information about the recipe mentioned in the cooking webpage (e.g., ingredients, cooking time, service portions) and/or modules with related recipes to the recipe mentioned in the cooking webpage being selected by the experience triggering component 16. Another example for a private webpage (e.g., bank login page) includes the experience triggering component 16 selecting the modules that present personalized content. The experience triggering component 16 may have one or more machine learning models determining which modules or experience levels to use in the side pane 26 for the webpage 30 and/or which additional content 28 to include in the side pane 26. As such, the experience triggering component 16 decides which side pane experiences to trigger for the input webpage 30.

After the triggering decisions are made by the page classification component 14 and/or the experience triggering component 16, the data generator component 18 sends out requests to corresponding data sources 106 for data collection. The data sources 106 may include different data sources from heterogeneous data providers for different content (e.g., article recommendations, questions and answers). For example, a page summary may come from a document index. In addition, other additional content (e.g., a knowledge card, an entity pane and/or related answers) may be integrated by directly calling different data sources 106. The data sources 106 may provide the content at runtime when the request comes to the runtime server 104.

A data aggregator component 20 aggregates the collected content from the data sources 106 and aggregates the collected content from a content datastore 108. The content datastore 108 may be a central document index repository that the data aggregator component 20 access when the request 24 with a URL is received at the runtime server 104.

The content datastore 108 may have one or more machine learning models that generate content offline. The content datastore 108 may receive content in a batch mode triggered offline on top of the web index data following an URL selection module for the sake of capacity to support the webpages (e.g., important webpages or static webpages). The content datastore 108 may also receive content in a reactive streaming mode triggered when the user opens a webpage which is not in the content repository and/or web index. The content datastore 108 may also receive content when a new webpage is crawled by the web index crawler. Together these three modes continue to update the content datastore 108 to continually refresh the content stored and provide updated content to the data aggregator component 20 for use with the side pane. The data aggregation component 20 provides the runtime server 104 more flexibility to handle different data sources 106.

The data aggregator component 20 stores the additional content 28 into a session datastore 110 as a snapshot of the current user session for the webpage 30. The snapshot provides an overview of the additional content 28 presented to the user in the side pane 26 in the user session for the webpage 30. The snapshot may be used to update the additional content 28 in the side pane 26 in response to user interactions with the additional content 28 to prevent the same additional content 28 presented to the user 114. The user datastore 112 may store content related to the user profile of the user 114.

The orchestrator component 22 fetches the data (e.g., the additional content) from the session datastore 110 and organizes the additional content 28 for rendering. The orchestrator component 22 finalizes the components, rankings, and whole page optimization for presenting the additional content in the side pane 26. The orchestrator component 22 sends the additional content 28 to the user interface rendering component 10 on the browser for rendering and presenting to the user 114 in the side pane 26.

The rendering component 10 may present the additional content in the side pane 26 next to the webpage 30. The rendering component 10 may facilitate user interactions with the additional content on the side pane 26, such as, clicking on a related article or scrolling down or down. Updates to the user profile and session store based on the user interactions may be sent to the runtime server 104 and updated accordingly to support a personalized experience for the user 114.

The rendering component 10 may perform additional processing on the presentation of the side pane 26. For example, the rendering component 10 may resize the side pane 26 (e.g., make the side pane bigger or smaller by expanding a width of the side pane, reducing a width of the side pane, expanding a height of the side pane, and/or reducing a height of the side pane) based on user input or device display characteristics (e.g., a size of the display). In addition, the rendering component 10 may open the additional content 28 in a new tab based on user input. For example, if the user selects to open a topic of interest icon in a new tab, a webpage for the topic of interest may open in a new tab.

The environment 100 may have multiple machine learning models running simultaneously. In some implementations, one or more computing devices are used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the browser 102, the runtime server 104, the data sources 106, the content datastore 108, the session datastore 110, and/or the user datastore 112 are implemented wholly on the same computing device. Another example includes one or more subcomponents of the browser 102, the runtime server 104, the data sources 106, the content datastore 108, the session datastore 110, and/or the user datastore 112 implemented across multiple computing devices. Moreover, in some implementations, the runtime server 104, the data sources 106, the content datastore 108, the session datastore 110, and/or the user datastore 112 are implemented or processed on different server devices of the same or different cloud computing networks. Moreover, in some implementations, the features and functionalities are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
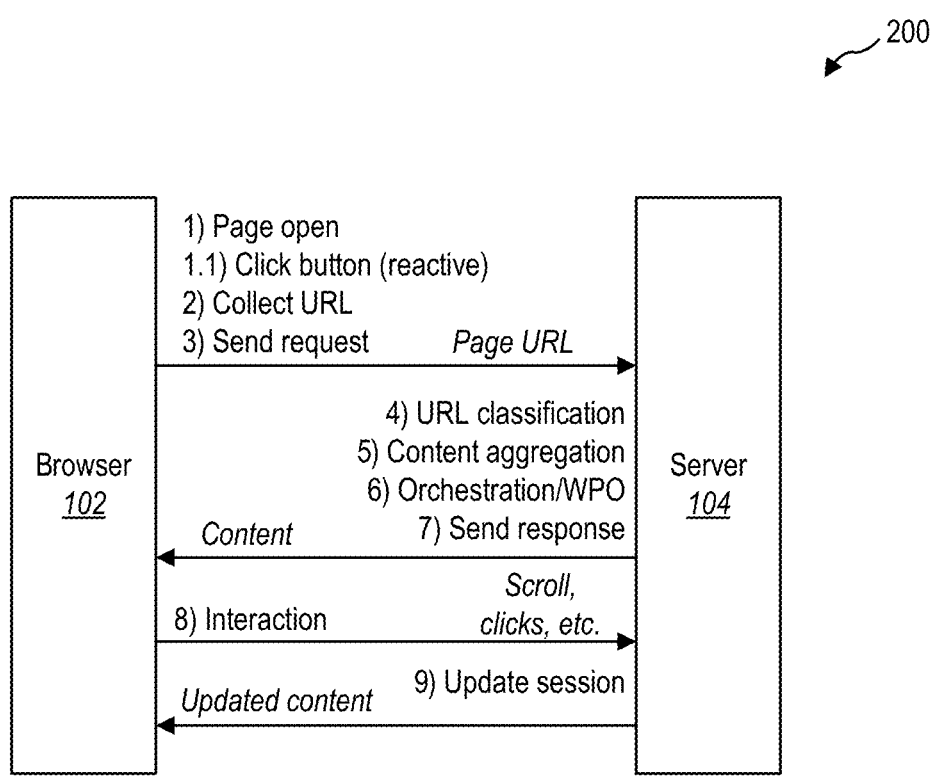
FIG. 2 illustrates an example method for identifying additional content for a webpage in accordance with implementations of the present disclosure.

Referring now to FIG. 2, illustrated is an example method 200 for identifying additional content for a webpage. The actions of the method 200 are discussed below with reference to the architecture of FIG. 1.

At 1, the method 200 includes opening a webpage. The user 114 opens a webpage 30 (FIG. 1) on the browser 102 by, for example, clicking on the URL of the webpage 30.

At 1.1, the method 200 includes receiving a click of a button. The user 114 clicks on a toolbar button on the browser 102 for the side pane 26 (FIG. 1).

At 2, the method 200 includes collecting the URL of the webpage. The browser 102 may collect the URL of the webpage 30.

At 3, the method 200 includes sending a request (e.g., request 24) to the runtime server 104. The browser 102 may send the request 24 to the runtime server 104 for additional content 28 (FIG. 1) to present in a side pane 26 next to the webpage 30. The request 24 includes the URL of the webpage 30. The request 24 may be sent in response to the user 114 selecting the button on the browser 102. In addition, the request 24 may be automatically sent in response to the user 114 opening the webpage 30.

At 4, the method 200 includes classifying the URL. The runtime server 104 receives the request 24 and runs the URL classification to decide whether to trigger the side pane 26 and determines a class and domain for the URL.

At 5, the method 200 includes collecting and aggregating content. Based on the webpage class and domain, the runtime server 104 collects and aggregates content from multiple data providers.

At 6, the method 200 includes orchestrating whole page optimization (WPO). After aggregating all available data, the runtime server 104 performs an arbitration and whole page optimization targeting user engagement to determine the placement of all modules selected for the additional content to include in the side pane. The whole page optimization determines a position of the modules and a ranking of the modules and determines the additional content 28 for placement in the side pane 26. The whole page optimization determines a design of the side pane 26 and how to show the additional content 28 in the side pane 26 to optimize the presentation of the modules and the additional content 28 in the side pane 26.

At 7, the method 200 includes sending the additional content to the browser. The runtime server 104 sends back the organized payload to a client side (the browser 102) for rendering. For proactive triggering, the side pane 26 opens by default (automatically) once the data is returned from runtime server 104.

At 8, the method 200 includes sending user interactions to the runtime server. After the loading of the first page on side pane 26, further user interactions with the side pane 26 (e.g., scrolls, clicks in feeds, clicks on topics, clicks on a knowledge card, etc.) are sent to the same runtime server 104.

At 9, the method 200 includes updating the session with refreshed content. Based on the interaction events, the runtime server 104 updates the session and user profiles and fetches additional content 28 with the updated information. The refreshed content is sent back to client side (the browser 102) for an asynchronized update on the side pane 26.

If a side pane 26 is open on the browser 102, and the user inputs a new URL in an address bar to open a new webpage in a current tab, the method 200 may start from action 2 to collect the new URL and request the runtime server 104 to refresh the side pane 26 with additional content 28 related to the webpage of the new URL.

If a side pane 26 is open on the browser 102, and the user refreshes a current webpage to force a reload, the method 200 may start from action 2 to collect the URL to reflect any changes to the webpage 30. A new request 24 is sent to runtime server 104 for new additional content 28 to refresh the side pane 26.

For a specific URL, if there is no content from the content repository, the side pane 26 does not show any contextual data for the webpage 30 (e.g., if the webpage is private) and provides personalized articles recommendation in the side pane 26 if the user profile is available. If the user profile is not available, the side pane 26 only shows trending articles recommendations.

Figure 3:
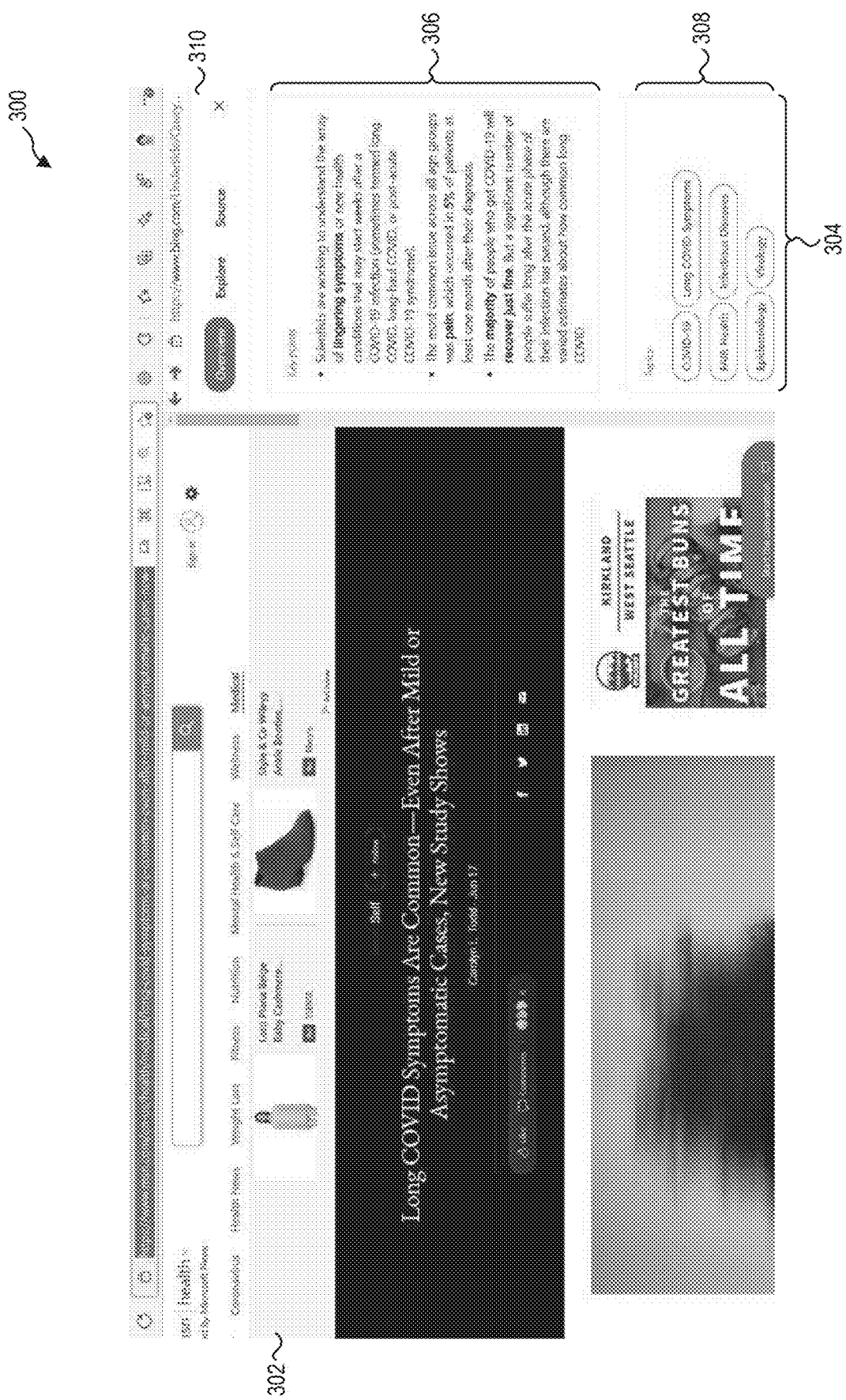
FIG. 3 illustrates an example graphical user interface of a browser displaying a webpage and a side pane including a summary module in accordance with implementations of the present disclosure.

Referring now to FIG. 3, illustrated is an example graphical user interface (GUI) of a browser 102 displaying a webpage 302 and a side pane 304 including a summary module 306 providing key points from the webpage 302 summarizing the content of the webpage 302.

The runtime server 104 may determine to display the summary module 306 for the webpage 302. The summary module 306 may not be appropriate for all webpages. Due to the form of the text, for some webpages, a summary module is not useful. For instance, a summary for poems, lyrics, online chats, forums, frequently asked questions (FAQ), tax forms, classified ads, shopping pages, religious scriptures, stock quotes, may not be useful to the user 114. In addition, due to the form of the content of the webpage, the content may not be able to be summarized. For example, a summary of online video games, bank accounts, login pages, hotel reservation, flight schedules, TV channels, etc. may not be appropriate.

The summary module 306 may generate the summary based on the original document. The runtime server 104 may select part of the webpage 302 to generate the summary. In addition, the runtime server 104 may generate the summary of the webpage 302 by interpreting the content of the webpage 302 by providing topics and key points of the document. The topics may be presented in a topics module 308 identifying the topics of the webpage 302. The identified topics and key phrases may be relevant to the content of the webpage 302 and may cover a wide spectrum of categories. The topics and key phrases may be clickable and the side pane 304 may refresh with additional content related to the topic or key phrase selected. The side pane 304 may include a navigation bar 310 where the user 114 may return to a previous side pane 304.

Figure 4:
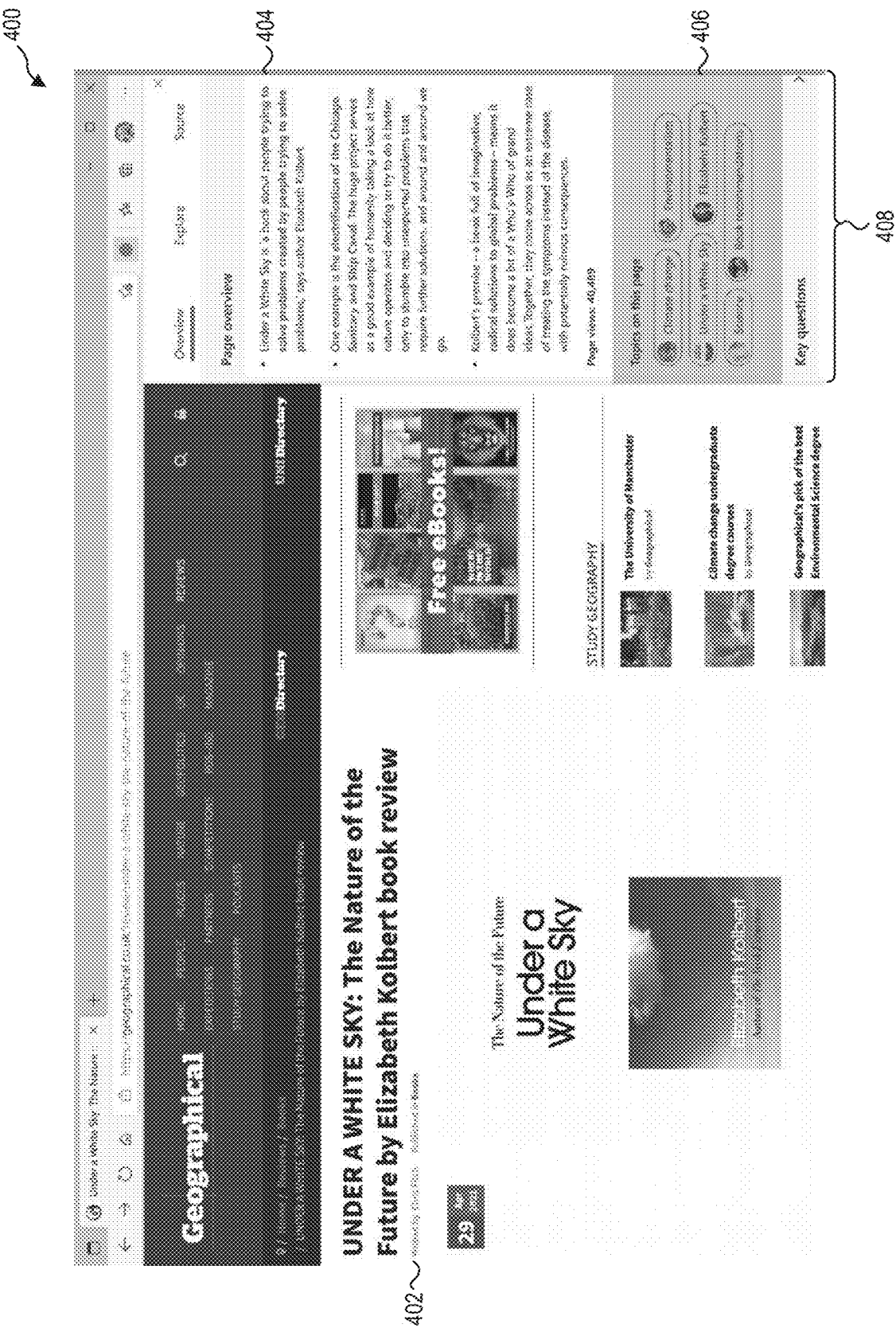
FIG. 4 illustrates an example graphical user interface of a browser displaying a webpage and a side pane including a page overview module and a topics module in accordance with implementations of the present disclosure.

Referring now to FIG. 4, illustrated is an example GUI 400 of a browser 102 displaying a webpage 402 and a side pane 408 including a page overview module 404 and a topics module 406. The topics module 406 may present one or more main topics of the webpage 402. The page overview module 404 may provide a summary of the content of the webpage 402.

Figure 5:
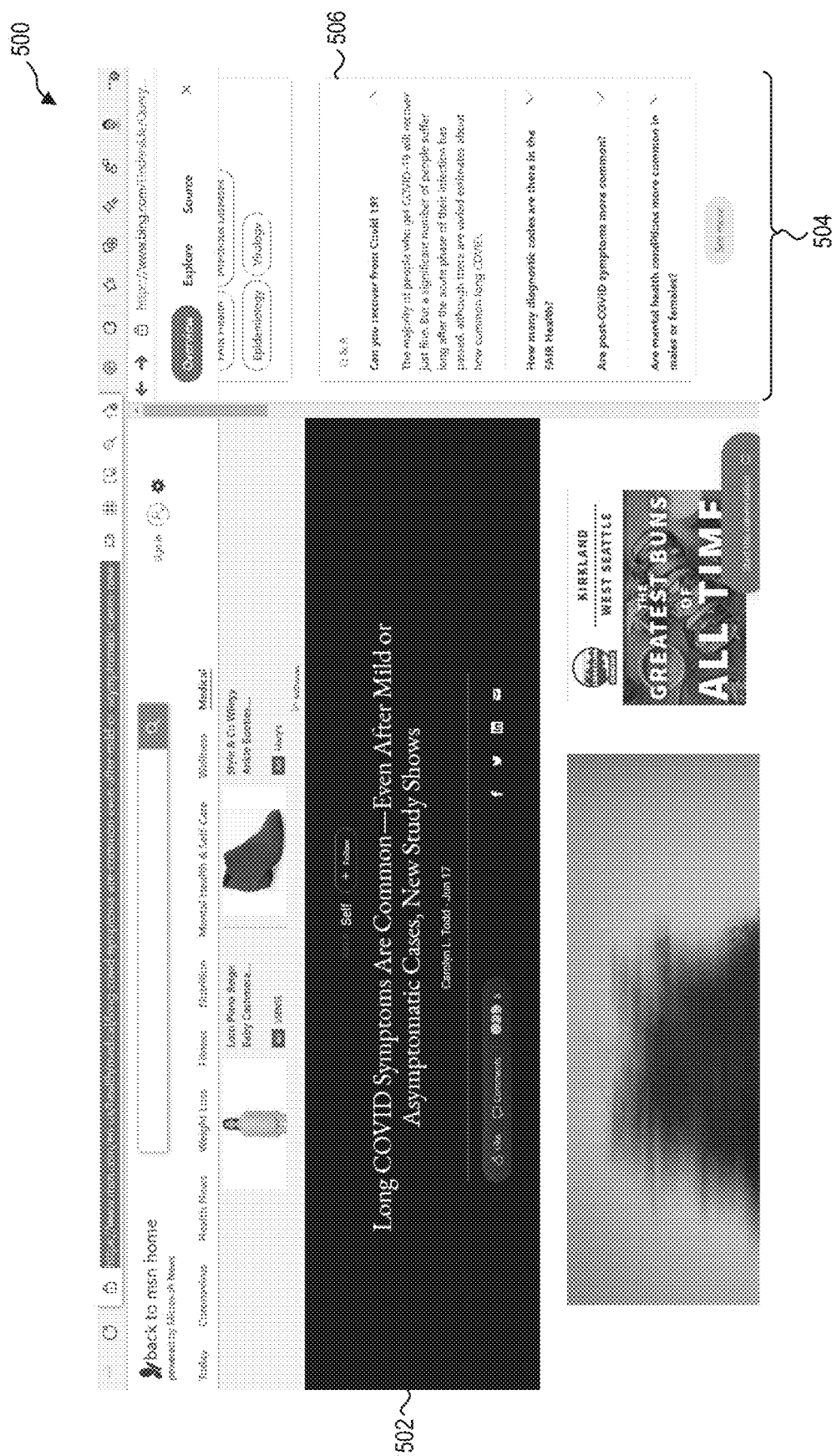
FIG. 5 illustrates an example graphical user interface of a browser displaying a webpage and a side pane including a questions and answer module in accordance with implementations of the present disclosure.

Referring now to FIG. 5, illustrated is an example GUI 500 of a browser 102 displaying a webpage 502 and a side pane 504 including a questions and answer module 506. The question and answer module 506 may enable users to better understand what the current webpage 502 is about. The questions selected by the runtime server 104 may include questions that are interesting and not too obvious to spark the user's curiosity; questions that lead to a better understanding of the webpage 502; and diverse questions that address the entire content of the webpage 502 (instead of focusing on a subset/part of the content of the webpage 502). The questions may be linkable allowing the user 114 to jump to the actual passage in the webpage 502 from where the answers are extracted.

Figure 6:
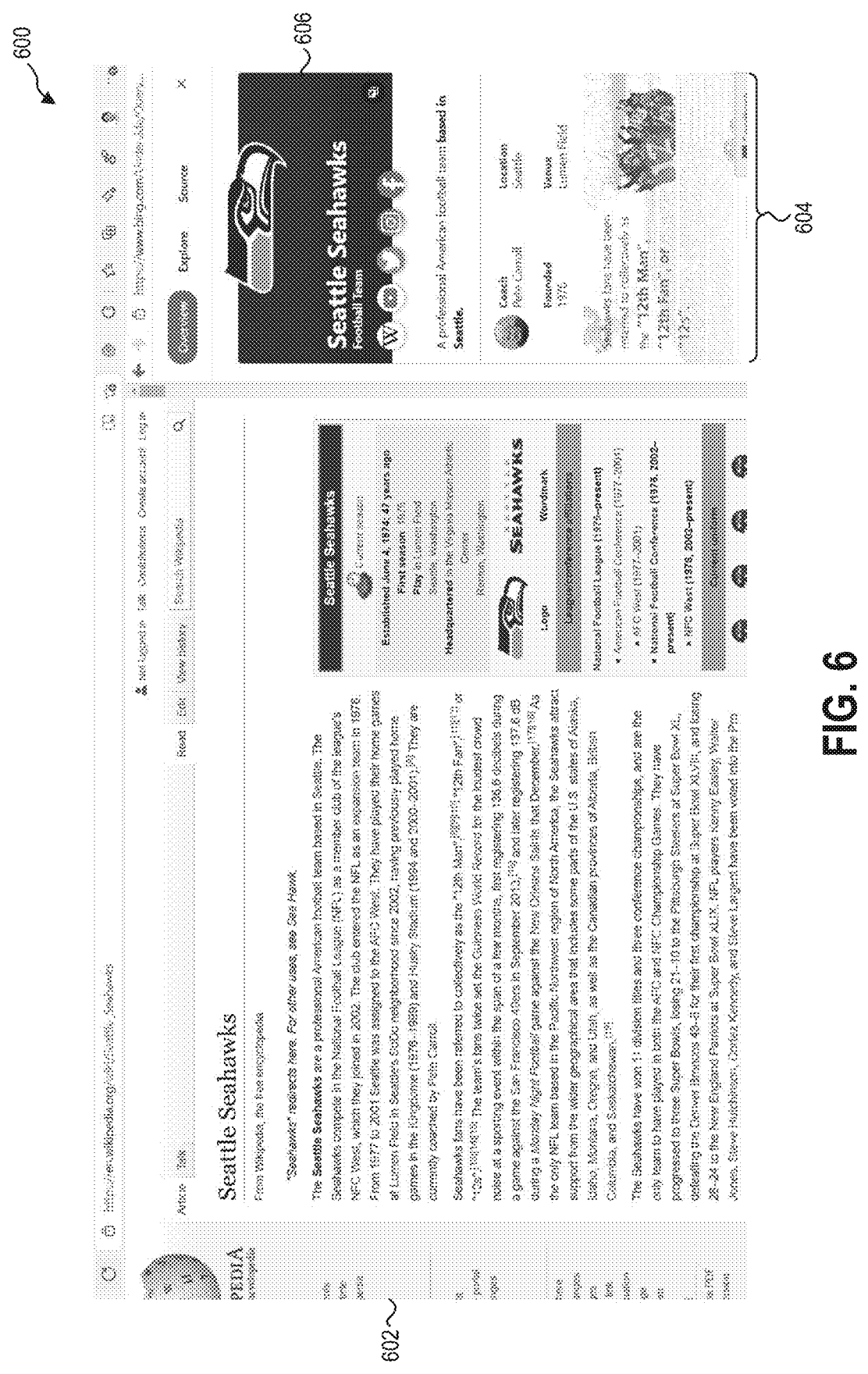

Referring now to FIG. 6, illustrated is an example GUI 600 of a browser 102 displaying a webpage 602 and a side pane 604 including a knowledge card module 606. The runtime server 104 may trigger a knowledge card for the dominant entity of the webpage 602. For example, a knowledge card may be provided for a sports team mentioned in the webpage 602. If the webpage 602 has multiple salient entities, the runtime server 104 may provide an appropriate experience highlighting all the salient entities. The knowledge cards may be dynamic, rotating and/or updating facts per the user's session.

Figure 7:
FIG. 7 illustrates an example graphical user interface of a browser displaying a webpage and a side pane including an about the source module in accordance with implementations of the present disclosure.

Referring now to FIG. 7, illustrated is an example GUI 700 of a browser 102 displaying a webpage 702 and a side pane 704 including an about the source module 706. The about the source module 706 may provide information about the publisher or data source of the webpage 702.

Figure 8:
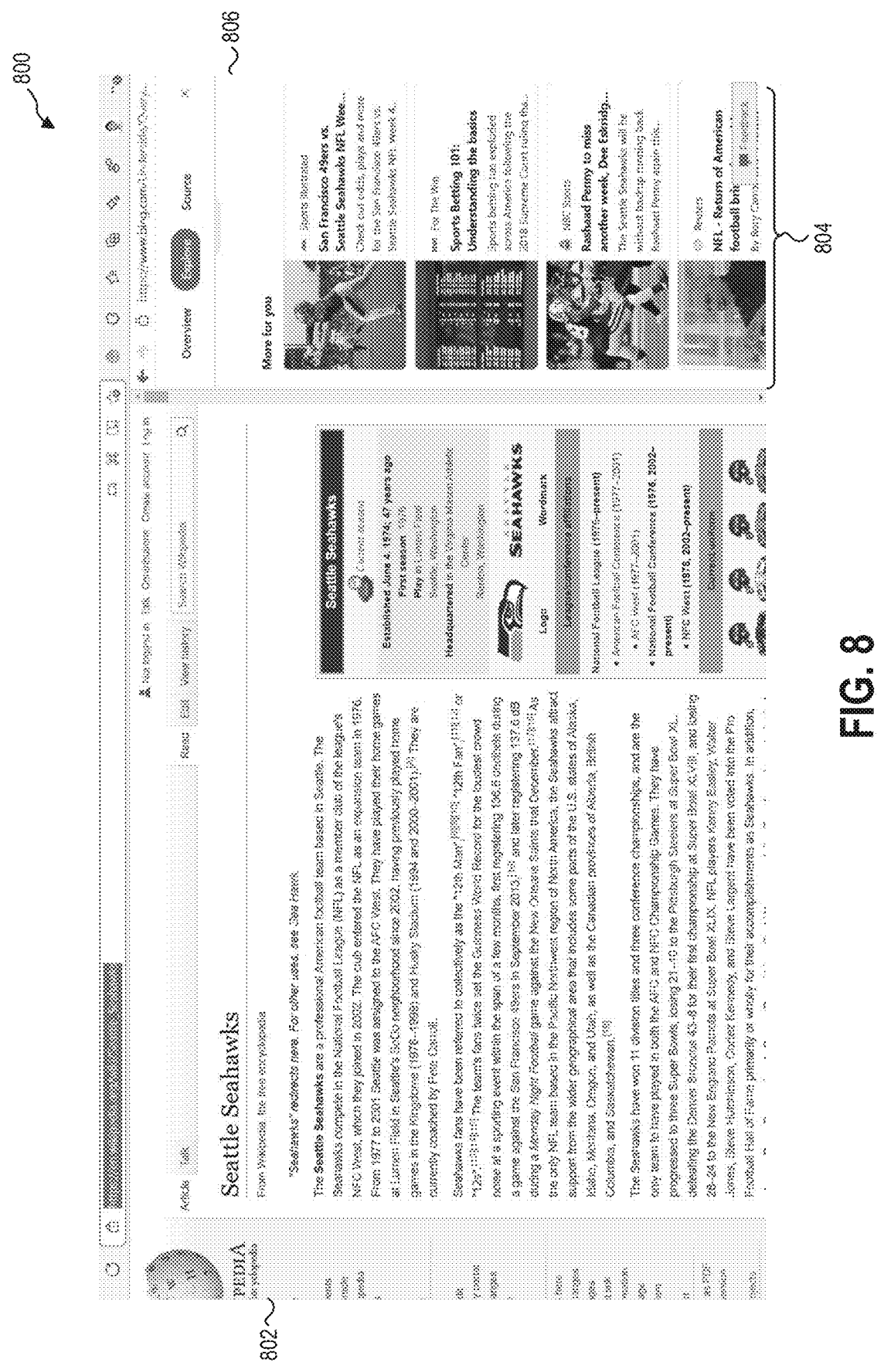

Referring now to FIG. 8, illustrated is an example GUI 800 of a browser 102 displaying a webpage 802 and a side pane 804 including a recommended content module 806 with related content to the webpage 802. The related content may help spike a user's interest in the browsing session and keep the user 114 engaged.

The recommended content module 806 may include a more for you section that provides additional related content to the webpage 802. The runtime server 104 may provide a related content feed to present on the side pane 804 with recommended content for the webpage 802. The recommended content may be related to similar topics as the content of the webpage 802 (e.g., the same topic as an article on the webpage 802). The recommended content may be diverse content about different topics or themes. The recommended content may be interesting content with a title or snippet of the content to convey the interesting factor of the content. The recommended content may have thumbnail images so that each image is unique in a related content feed. The recommended content may be ranked with fresh content having higher rankings and placed at the top of the related content feed. The recommended content may be from authoritative sources and may promote content that is non time sensitive. The related content feed may have an infinite scroll where the user 114 may view new content as the user 114 scrolls down the side pane 804. The recommended content may be personalized to the user's interests and/or personalized based on past user interactions with the browser. The recommended content may add page views counts on articles provided to entice users to view the recommended content.

If the user 114 selects one of the articles in the related content feed, the browser 102 may open the selected article in the side pane 804. In addition, the browser 102 may open the selected article in a new tab. The side pane 804 may refresh with new page content following the user 114 opening the related article.

The browser 102 may adjust the width of the side pane 804. In addition, the browser 102 may provide one or more overlays on top of the side pane 804. For example, if the user clicks on a link to related content, the related content may present in an overlay on top of the side pane 804. The browser 102 may also load the related content in the main window replacing the webpage 802.

Figure 9:
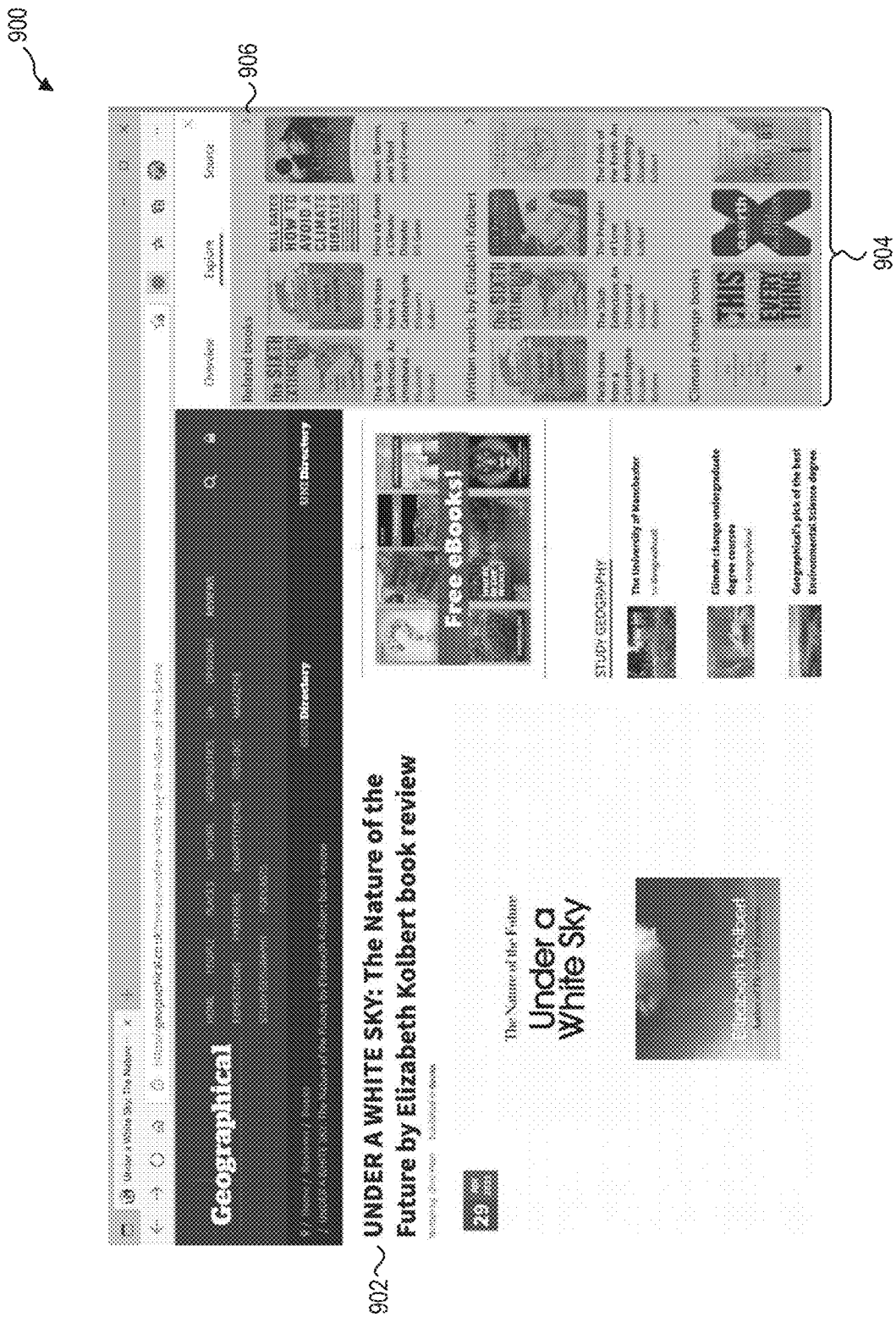
FIG. 9 illustrates an example graphical user interface of a browser displaying a webpage and a side pane including a books module in accordance with implementations of the present disclosure.

Referring now to FIG. 9, illustrated is an example GUI 900 of a browser 102 displaying a webpage 902 and a side pane 904 including a books module 906. The books module 906 may provide related books based on the content of the webpage 902. By providing the related books to the content of the webpage 902, the side pane 904 may provide the user 114 with additional contextual information and allow for faster task completion (e.g., buying a book).

Figure 10:
FIG. 10 illustrates an example graphical user interface of a side pane including a shopping module in accordance with implementations of the present disclosure.

Referring now to FIG. 10, illustrated is an example GUI 1000 of a browser 102 displaying a side pane 1002 including a shopping module 1004. The side pane 1002 may be displayed next to, or adjacent to, a webpage. The shopping module 1004 may include products, coupons, deals related to the content of the webpage. Moreover, the side pane 1002 may facilitate the user 114 in purchasing one of the products included in the shopping module 1004.

Figure 11:
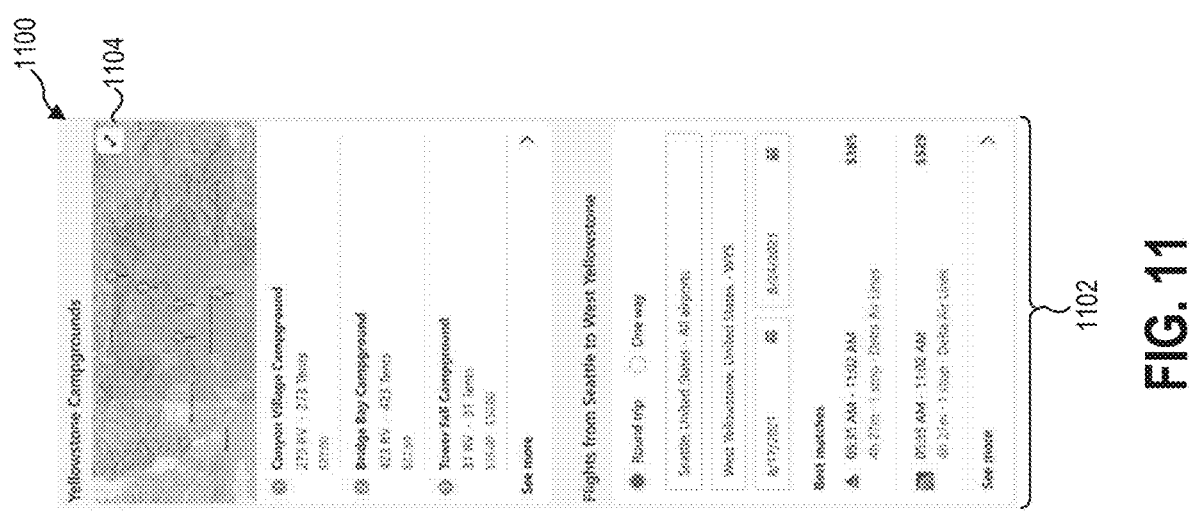
FIG. 11 illustrates an example graphical user interface of a side pane including a travel module in accordance with implementations of the present disclosure.

Referring now to FIG. 11, illustrated is an example GUI 1100 of a browser 102 displaying a side pane 1102 including a travel module 1104. The side pane 1102 may be displayed on a side (e.g., a left side or a right side) of a webpage. The travel module 1104 may include a map with points of interests related to the content of the webpage. The travel module 1104 may also include the weather for a location discussed in the webpage. The travel module 1104 may also facilitate purchasing a ticket (e.g., flight or train) to the location mentioned in the webpage.

Figure 12:
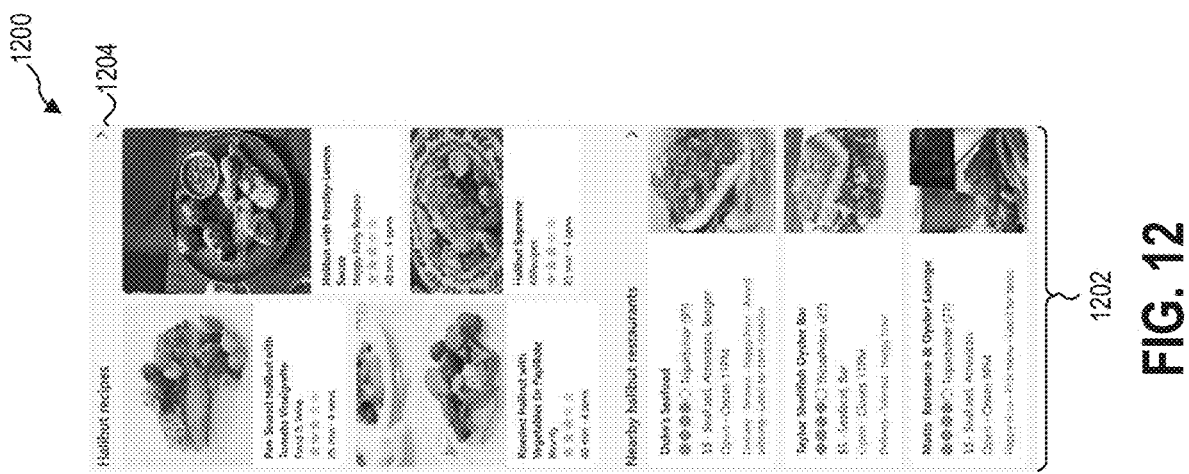
FIG. 12 illustrates an example graphical user interface of a side pane including a food module in accordance with implementations of the present disclosure.

Referring now to FIG. 12, illustrated is an example GUI 1200 of a browser 102 displaying a side pane 1202 including a food module 1204. The side pane 1202 may be presented below or above the webpage. The side pane 1202 may include recipes or restaurants related to the content of the webpage.

Figure 13:
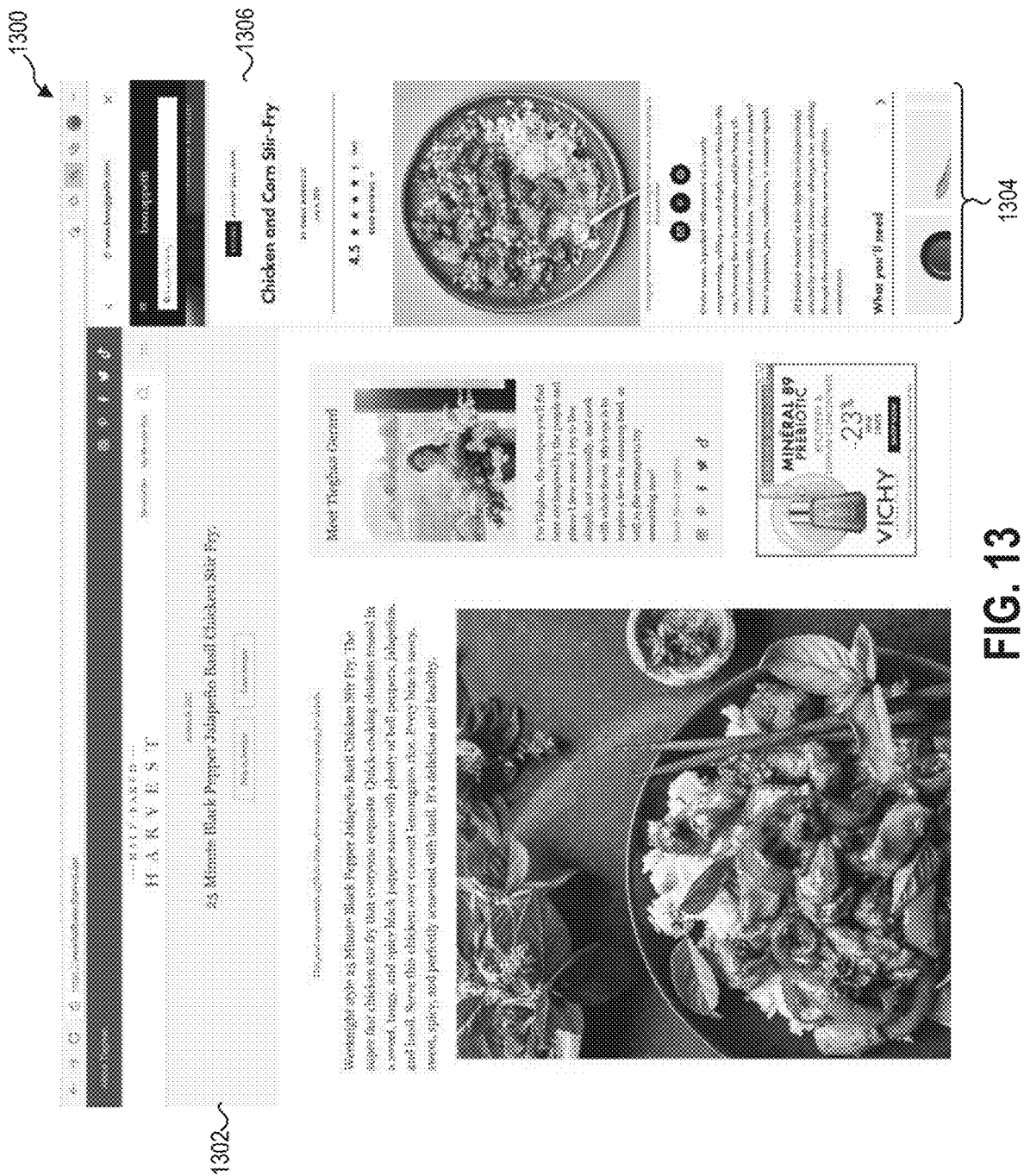
FIG. 13 illustrates an example graphical user interface of a browser displaying a webpage and a side pane including a cooking module in accordance with implementations of the present disclosure.

Referring now to FIG. 13, illustrated is an example GUI 1300 of an example of a browser 102 displaying a webpage 1302 and a side pane 1304 including a cooking module 1306. The webpage 1302 may include a recipe for cooking a stir fry dish. The side pane 1304 may include an overview module with an about this recipe module with information extracted from the content of the webpage 1302 for the stir fry dish. The about this recipe module may include the cooking time (15 minutes), the preparation time (10 minutes), the serving size (6), and the ingredients for the stir fry dish. A machine learning module may automatically extract this recipe information from the content of the webpage 1302 to summarize the recipes.

The side pane 1304 may also include a cooking module 1306 with a related recipe. The related recipe may be a single recipe or a feed of related recipes. The related recipes may be based on the content of the webpage 1302. The related recipes may be similar to the recipe in the webpage 1302. The feed of related recipes may include images of the different recipes with a name of the dish. The user 114 may scroll through the feed of related recipes and may continue to receive additional recipes as the user continues to scroll through the feed of related recipes on the side pane 1304. The user 114 may click on any related recipe and have recipes facts load in the side pane 1304. The user may also have a webpage with the related recipe open in the side pane 1304. The related recipe recommendations may be recipes from the same publisher of the webpage the user is viewing or may be recipes from different publishers than the webpage the user is viewing. A machine learning models may determine the most relevant recipes based on, for example, the ingredients, cuisine styles mentioned in the webpage 1302.

Figure 14:
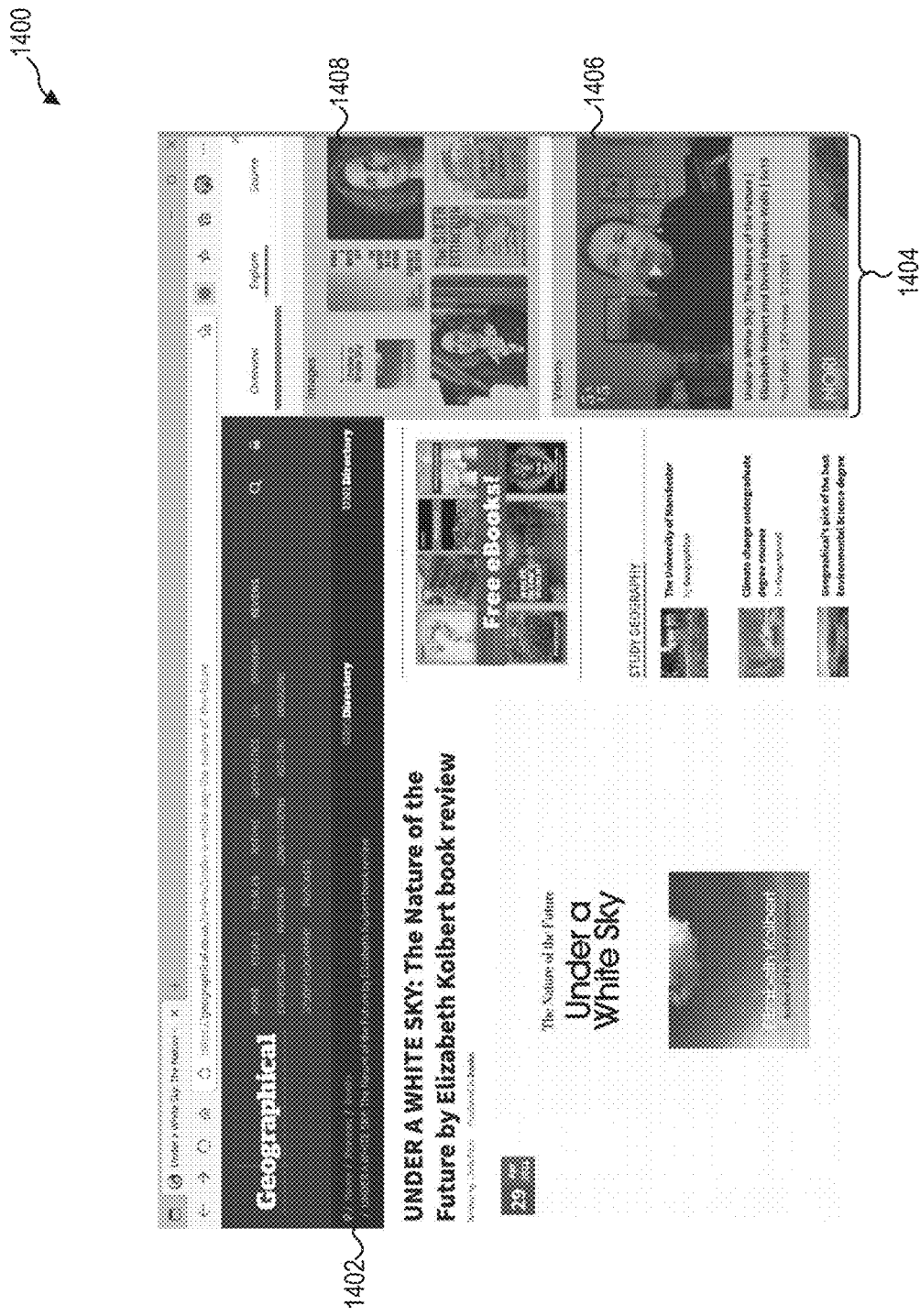
FIG. 14 illustrates an example graphical user interface of a browser displaying a webpage and a side pane including related videos and images in accordance with implementations of the present disclosure.

Referring now to FIG. 14, illustrated is an example GUI 1200 of a browser 102 displaying a webpage 1402 and a side pane 1404 including related videos 1406 and images 1408 to the content of the webpage 1402.

Figure 15:
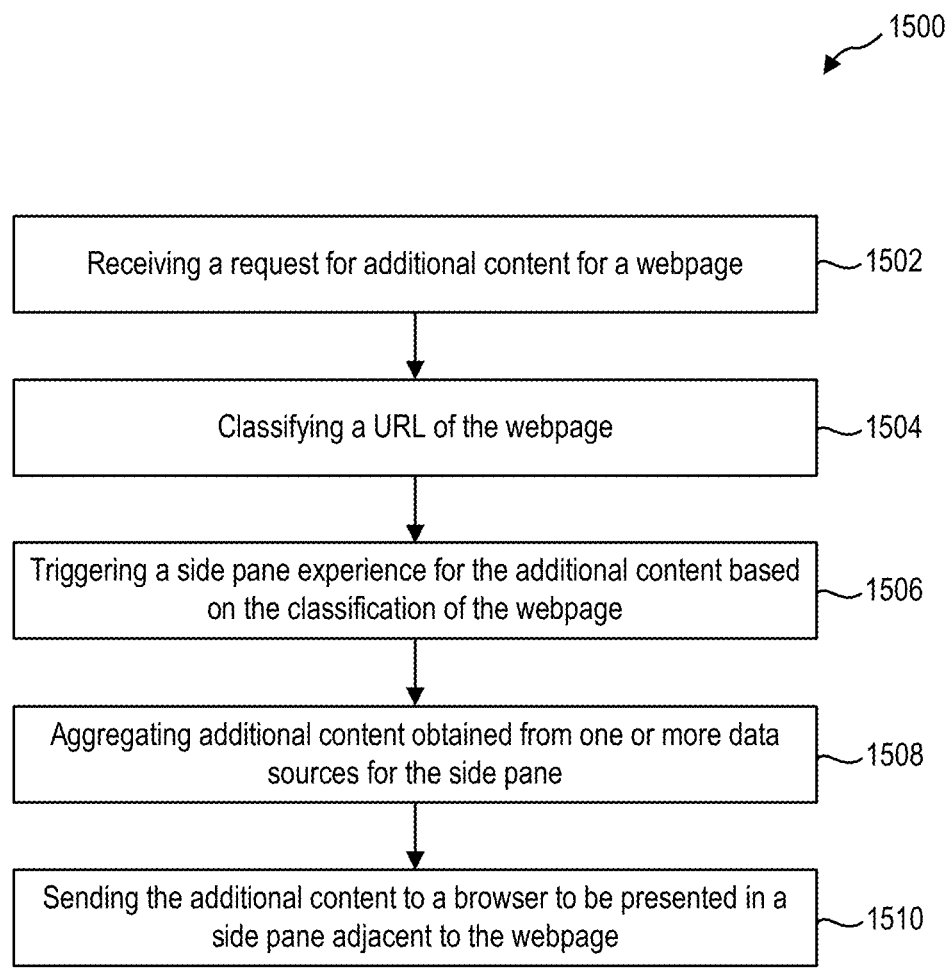
FIG. 15 illustrates an example method for automatically identifying additional content for a webpage in accordance with implementations of the present disclosure.

Referring now to FIG. 15, illustrated is an example method 1500 for automatically identifying additional content for a webpage. The actions of the method 1500 are discussed below with reference to the architecture of FIG. 1. The actions of the method 1500 may be performed by a runtime server 104 (FIG. 1).

At 1502, the method 1500 includes receiving a request for additional content for a webpage. The runtime server 104 receives a request 24 for additional content 28 for a webpage 30. In some implementations, the request 24 is sent in response to a user 114 selecting a button on the browser 102. In some implementations, the request 24 is automatically sent in response to a user 114 accessing the webpage 30 using the browser 102.

At 1504, the method 1500 includes classifying a URL of the webpage. The server 104 classifies the URL of the webpage 30. In some implementations, classifying the URL of the webpage 30 is performed by one or more machine learning models. In some implementations, the one or more machine learning models include a transformer machine learning model. In some implementations, the one or more machine learning models include a classification model, a binary model, a regression model, and/or a language model. The machine learning models identify a domain (e.g., travel, sports, cooking, shopping) of the URL of the webpage 30 and determine the classification of the URLs of the webpages 30 based on the domain.

At 1506, the method 1500 includes triggering a side pane experience for the additional content based on the classification of the webpage. The server 104 triggers a side pane 26 experience for the additional content 28 based on the classification of the webpage 30. In some implementations, triggering the side pane experience for the additional content is performed by one or more machine learning models. In some implementations, the one or more machine learning models include a transformer machine learning model. In some implementations, the one or more machine learning models include a classification model, a binary model, a regression model, and/or a language model. The machine learning models selects one or more modules for presenting the additional content 28 based on the classification of the URL of the webpage 30.

In some implementations, triggering the side pane experience identifies one or more modules to include in the side pane for presenting the additional content. In some implementations, the one or more modules are default modules. The server 104 may select different modules for different webpage domains. Example modules include, but are not limited to, a summary module, a questions and answer module, a recommended content module, a personalized content module, a page overview module, an explore module, a topics module, a key points module, a knowledge card module, a source module, a cooking module, a food module, a travel module, a shopping module, or a books module. In some implementations, the server 104 performs an optimization of the one or more modules that includes ranking the one or more modules for determining an order for presenting the one or more modules in the side pane based on the context of the webpage 30. Due to the form and/or content of the webpage 30, different modules are more useful as compared to other modules for the webpage 30. For example, if the context of the webpage 30 is shopping, the summary module has a lower ranking as compared to an explore module that allows the user to explore additional products related to the products on the webpage 30. Another example includes if the context of the webpage 30 is an article on a virus, the summary module and key points modules have a higher ranking as compared to a shopping module.

At 1508, the method 1500 includes aggregating additional content obtained from one or more data sources for the side pane experience. The server 104 aggregates the additional content 28 obtained from the one or more data sources 106 for the side pane experience. In some implementations, aggregating the additional content 28 for the side pane experience is performed by one or more machine learning models. In some implementations, the one or more data sources 106 include different data providers for different content. In some implementations, the one or more data sources 106 include document indexes or content data stores.

At 1510, the method 1500 includes sending the additional content to a browser to be presented in a side pane adjacent to the webpage. The server 104 sends the additional content 28 to a browser 102 to be presented in a side pane 26 nearby or adjacent to the webpage 30. In some implementations, the additional content includes images or videos.

In some implementations, the server 104 performs a whole page optimization to organize the additional content 28 for rendering in the side pane 26. The whole page optimization includes applying a ranking to the additional content 28 to determine an order for presenting the additional content 28 in the side pane 26. For example, the ranking is based on a relevancy of the additional content 28 to the context. In some implementations, the relevancy is determined by identifying entities or topics in the additional content 28 that match identified entities or topics in the content of the webpage 30. A threshold level is set and if the number of matching entities or topics exceeds the threshold level, the additional content 28 is relevant to the content of the webpage 30. An example threshold level is four matching entities or topics. If the number of matching entities or topics is below the threshold level, the additional content 28 is not relevant to the content of the webpage 30. The additional content 28 with the matching entities or topics that has a higher ranking relative to the additional content 28 with the number of matching entities or topics is below the threshold level.

In some implementations, the server 104 stores the additional content 28 in a session datastore 110 for a user 114. The session datastore 110 provides a snapshot of a current user session and identifies the additional content 28 presented to the user 114 in the side pane 26 during the current user session.

In some implementations, the server 104 determines whether the request 24 is for a newly accessed webpage, and if the request 24 the request 24 is for a newly accessed webpage, the server 104 performs the classification (1504) of the URL for the webpage 30. If the request 24 is from a user interaction in the side pane 26 for the webpage 30, the server 104 accesses the current user session for the webpage 30 from the session datastore 110 and sends different additional content 28 to the browser 102 to be presented in the side pane 26 adjacent to the webpage 30. User interactions include, but are not limited to, clicking on the additional content, scrolling up to a top portion of the side pane, or scrolling down to a bottom portion of the side pane. The server 104 stores the user interaction as part of the current user session for the webpage 30 in the session datastore 110.

Figure 16:
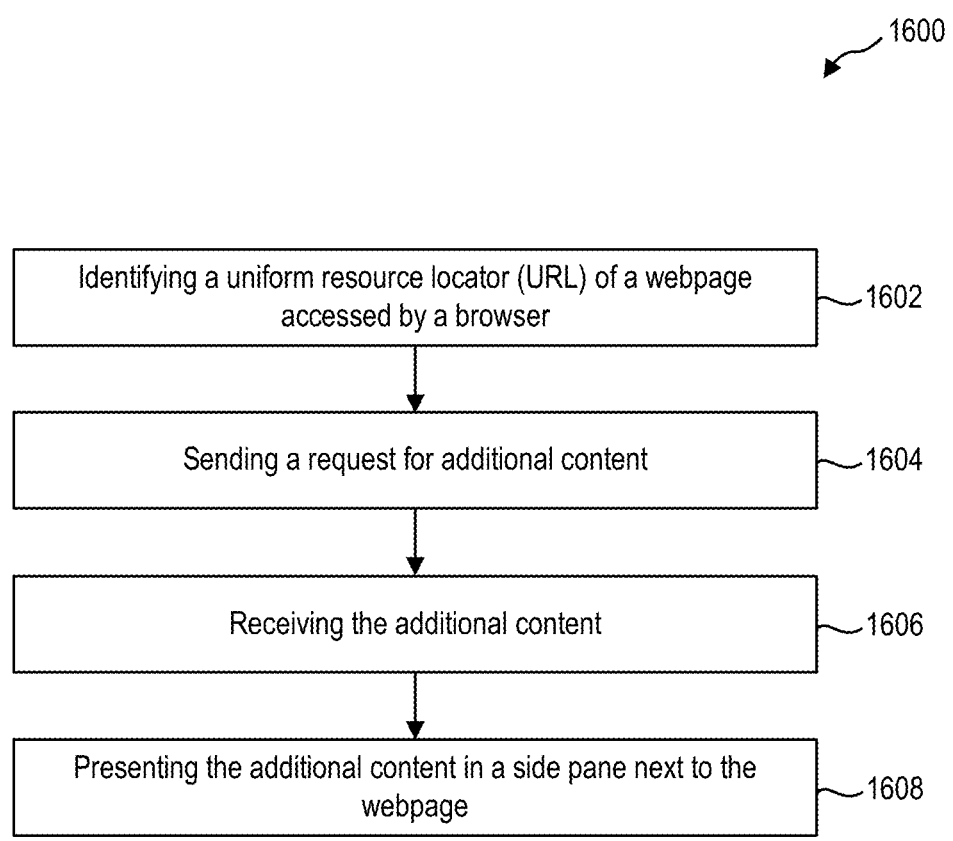
FIG. 16 illustrates an example method for presenting additional content for a webpage in accordance with implementations of the present disclosure.

Referring now to FIG. 16, illustrated is an example method 1600 for presenting additional content for a webpage. The actions of the method 1600 are discussed below with reference to the architecture of FIG. 1. The actions of the method 1600 may be performed by a browser 102 (FIG. 1).

At 1602, the method 1600 includes identifying a uniform resource locator (URL) of a webpage accessed by a browser. The browser 102 identifies the URL of a webpage 30 accessed by a user 114.

At 1604, the method 1600 includes sending a request for additional content. The browser 102 sends a request 24 for additional content 28. The request 24 includes the URL of the webpage 30. In some implementations, the request 24 for the additional content 28 is sent in response to a user 114 selecting a button or icon on the browser 102 that is continuously enabled on the browser 102 when the user 114 is browsing websites. In some implementations, the request 24 for the additional content 28 automatically is sent in response to one or more of the browser 102 accessing the webpage 30 or in response to the URL of the webpage 30 matching one or more domains.

At 1606, the method 1600 includes receiving the additional content. The browser 102 receives the additional content 28. In some implementations, the additional content 28 is based on a context of the webpage 30. The context of the webpage 30 includes the content of the webpage 30.

At 1608, the method 1600 includes presenting the additional content in a side pane next to the webpage. The browser 102 presents the additional content 28 in a side pane 26 next to or adjacent to the webpage 30. In some implementations, the browser 102 resizes the side pane 26 by one or more of expanding a width of the side pane 26, reducing a width of the side pane 26, expanding a height of the side pane 26, or reducing a height of the side pane 26. In some implementations, the browser 102 receives a selection of the additional content 28 and opens the selected additional content 28 within the side pane 26 or in a new tab of the browser 102.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a binary model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The present disclosure relates to systems and methods for identifying additional content for a webpage. The systems and methods create a side pane that is placed next to or adjacent to a webpage to supplement a webpage that a user is viewing. The side pane provides additional information and/or additional content to the user and the side pane remains with the main view of the webpage. The additional content provides webpage insights, such as, page summary, page topics, and/or key entities that help the users consume the current webpage's content and/or recommend contextual or personalized content (related articles) for the users to further explore. In some implementations, the additional content comes from a plurality of sources. In some implementations, the additional content is based on the context of the webpage currently being browsed by the user. In some implementations, the additional content includes content derived from the web page.

In some implementations, the side pane is opened reactively based on the user's input. The user may click on a toolbar icon on the browser and, in response to the user clicking the toolbar icon, the side pane opens with the additional content. One example includes, in response to a user accessing a webpage for a sports team and clicking on a toolbar icon for the side pane, the system identifies an entity card for the sports team as the additional content and presents the side pane adjacent to the webpage with the entity card.

In some implementations, the side pane is opened automatically based on the user accessing a webpage. One example includes, in response to a user accessing a webpage with an article describing throwing a dinner party that included different recipes for the dinner party, the system identifies additional content and presents the additional content in a side pane to the right of the webpage. The additional content includes the recipes mentioned in the article for the dinner party. The additional content includes information about the recipes mentioned in the article (e.g., ingredients, cooking time, service portions).

In some implementations, the side pane has one or more modules highlighting the additional content. The modules of the side pane help the user consume the content, help the user explore additional content, and/or help keep the user engaged in the browsing experience. In some implementations, the modules included in the side pane vary based on the domain of the webpage. For example, news, finance, shopping, weather, maps, sports, shopping, cooking, and travel domains include different modules in the side pane. In some implementations, the modules on the side pane include default modules (e.g., overview module, source module, explore module) that are included in webpages regardless of the domain of the webpage.

In some implementations, the modules of the side pane are generated by machine learning models reviewing the content of the webpage and associating the content of the webpages to topics mentioned in the webpage or topics related to the content mentioned in the webpage.

The systems and methods may be used as a reading assistant and a content discovery engine. The systems and methods leverage natural language understanding, machine reaching comprehension, and personalized recommendation techniques to make content relevant to a users' current tasks and long-term interests. In some implementations, the systems and methods proactively provide relevant information and enable further explorations without taking the users out of the current task workflow.

One technical advantage of the systems and methods is providing additional content powered by a browser, and thus, user engagement with the browser may increase. The systems and methods improve user efficiency by organizing and arranging the additional content into modules. The systems and methods also reduce the need for users to navigate to multiple websites, and thus, reduce user inputs and/or clicks. The systems and methods also improve trust of the users as several of the modules allow the users to understand the source and reputation of the websites. Moreover, the systems and methods improve the accessibility of websites that do not otherwise have good accessibility options.

The systems and methods gives users insight on the current viewed web document, enables in-depth exploration of the current topic, suggestion of new topics, understanding of various perspectives, and/or offers other in-context experiences to the users.

(A1) Some implementations include a method for automatically identifying additional content for a webpage. The method includes receiving (1502) a request (e.g., request 24) for additional content for the webpage (e.g., webpage 30), the request includes a uniform resource locator (URL) of the webpage. The method includes classifying (1504) the URL of the webpage. The method includes triggering (1506) a side pane experience for the additional content based on the classification of the webpage. The method includes aggregating (1508) additional content (e.g., additional content 28) obtained from one or more data sources (e.g., data sources 106) for the side pane experience, the additional content is obtained based on a context of the webpage. The method includes sending (1510) the additional content to a browser (e.g., browser 102) to be presented in a side pane (e.g., side pane 26) adjacent to the webpage (e.g., webpage 30).

(A2) In some implementations of the method of A1, the request is sent in response to a user selecting a button on the browser.

(A3) In some implementations of the method of A1 or A2, the request is automatically sent in response to a user accessing the webpage using the browser.

(A4) In some implementations of the method of any of A1-A3, classifying the URL of the webpage is performed by one or more machine learning models by identifying a domain of the URL of the webpage and determining a classification of the URL of the webpage based on the domain; and the one or more machine learning models include a classification model, a transformer model, a binary model, a regression model, or a language model.

(A5) In some implementations of the method of any of A1-A4, triggering the side pane experience identifies one or more modules to include in the side pane for presenting the additional content, and different modules are selected for different webpage domains.

(A6) In some implementations of the method of any of A1-A5, the one or more modules are default modules.

(A7) In some implementations of the method of any of A1-A6, the one or more modules include a summary module, a questions and answer module, a recommended content module, a personalized content module, a page overview module, an explore module, a topics module, a key points module, a knowledge card module, a source module, a cooking module, a food module, a travel module, a shopping module, or a books module.

(A8) In some implementations, the method of any of A1-A7 includes performing an optimization of the one or more modules that includes ranking the one or more modules for determining an order for presenting the one or more modules in the side pane based on the context of the webpage.

(A9) In some implementations of the method of any of A1-A8, the additional content includes images or videos.

(A10) In some implementations, the method of any of A1-A9 includes performing a whole page optimization to organize the additional content for rendering in the side pane.

(A11) In some implementations of the method of any of A1-A10, the whole page optimization includes applying a ranking to the additional content to determine an order for presenting the additional content in the side pane, and the ranking is based on a relevancy of the additional content to the context of the webpage.

(A12) In some implementations of the method of any of A1-A11, the relevancy is determined by identifying entities in the additional content that match identified entities in the webpage and comparing the matching entities to a threshold level; if the matching entities exceed the threshold level, determining that the additional content is relevant to the context of the webpage and providing a higher ranking to the additional content; and if the matching entities are below the threshold level, determining that the additional content is not relevant to the context of the webpage and providing a lower ranking to the additional content.

(A13) In some implementations, the method of any of A1-A12 includes storing the additional content in a session datastore for a user, and the session datastore provides a snapshot of a current user session and identifies the additional content presented to the user in the side pane during the current user session; determining whether the request is for a newly accessed webpage; if the request is for a newly accessed webpage, performing the classification of the URL for the webpage; and if the request is from a user interaction in the side pane for the webpage, accessing the current user session for the webpage from the session datastore and sending different additional content to the browser to be presented in the side pane adjacent to the webpage.

(A14) In some implementations, the method of any of A1-A13 includes storing the user interaction as part of the current user session for the webpage in the session datastore, and the user interaction includes one or more of clicking on the additional content, scrolling up to a top portion of the side pane, or scrolling down to a bottom portion of the side pane.

(A15) In some implementations of the method of any of A1-A14, the one or more data sources include different data providers for different content and the one or more data sources include document indexes or content data stores.

(A16) In some implementations of the method of any of A1-A15, triggering the side pane experience for the additional content and aggregating the additional content for the side pane experience is performed by one or more machine learning models selecting a plurality of modules for presenting the additional content based on an identified domain for the webpage.

(B1) Some implementations include a method for presenting additional content for a webpage. The method includes identifying (1602) a uniform resource locator (URL) of a webpage (e.g., webpage 30) accessed by a browser (e.g., browser 102). The method includes sending (1604) a request (e.g., request 24) for additional content, where the request includes the URL of the webpage. The method includes receiving (1606) the additional content (e.g., additional content 28) based on a context of the webpage of the webpage. The method includes presenting (1608) the additional content in a side pane (e.g., side pane 26) next to the webpage.

(B2) In some implementations of the method of B1, sending the request for the additional content occurs in response to a user selecting a button or icon on the browser that is continuously enabled on the browser when the user is browsing websites.

(B3) In some implementations of the method of B1 or B2, sending the request for the additional content automatically occurs in response to one or more of the browser accessing the webpage or in response to the URL of the webpage matching one or more domains.

(B4) In some implementations, the method of any of B1-B3 includes resizing the side pane by one or more of expanding a width of the side pane, reducing a width of the side pane, expanding a height of the side pane, or reducing a height of the side pane.

(B5) In some implementations, the method of any of B1-B4 includes receiving a selection of the additional content; and opening the selected additional content in the side pane or in a new tab of the browser.

Some implementations include a system (e.g., environment 100). The system includes one or more processors; memory in electronic communication with the one or more processors; and instructions stored in the memory, the instructions being executable by the one or more processors to perform any of the methods described here (e.g., A1-A15, B1-B5).

Some implementations include a computer-readable storage medium storing instructions executable by one or more processors to perform any of the methods described here (e.g., A1-A16, B1-B5).

Some implementations include a browser (e.g., browser 102) executable by one or more processors to perform any of the methods described herein (e.g., A1-A16, B1-B5).

Some implementations include a server (e.g., server 104) executable by one or more processors to perform any of the methods described herein (e.g., A1-A16, B1-B5).

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for automatically identifying additional content for a webpage, comprising:
    receiving a request for additional content for the webpage, wherein the request includes a uniform resource locator (URL) of the webpage;
    classifying the URL of the webpage;
    aggregating additional content, at least a portion of which is obtained from one or more data sources based on a context of the webpage;
    triggering a side pane experience including opening a side pane displaying a plurality of modules for presenting the additional content, the plurality of modules having different module types each defining a different organization and presentation of at least a portion of the additional content;
    sending the additional content to a browser to be presented in the one or more modules in the side pane adjacent to the webpage;
    determining whether to display an overview type of module that presents a first portion of the additional content, the first portion of the additional content being content that is derived from webpage content of the webpage; and
    based on the determination, selectively displaying the overview type of module.

2. The method of claim 1, wherein the request is sent in response to the user selecting a button on the browser.

3. The method of claim 1, wherein the request is automatically sent in response to the user accessing the webpage using the browser.

4. The method of claim 1, wherein classifying the URL of the webpage is performed by one or more machine learning models by identifying a domain of the URL of the webpage and determining a classification of the URL of the webpage based on the domain, and
    wherein the one or more machine learning models include a classification model, a transformer model, a binary model, a regression model, or a language model.

5. The method of claim 1, wherein different modules are selected for different webpage domains.

6. The method of claim 5, wherein the one or more modules types further include a default module, a summary module, a questions and answer module, a recommended content module, a personalized content module, a page overview module, an explore module, a topics module, a key points module, a knowledge card module, a source module, a cooking module, a food module, a travel module, a shopping module, or a books module.

7. The method of claim 5, further comprising:
    performing an optimization of the one or more modules, wherein the optimization includes ranking the one or more modules for determining an order for presenting the one or more modules in the side pane based on the context of the webpage.

8. The method of claim 1, wherein the additional content includes images or videos.

9. The method of claim 1, further comprising:
    performing a whole page optimization to organize the additional content for rendering in the side pane, wherein the whole page optimization includes applying a ranking to the additional content to determine an order for presenting the additional content in the side pane based on a relevancy of the additional content to the context of the webpage.

10. The method of claim 9, wherein the relevancy is determined by identifying entities in the additional content that match identified entities in the webpage and comparing the matching entities to a threshold level;
    if the matching entities exceed the threshold level, determining that the additional content is relevant to the context of the webpage and providing a higher ranking to the additional content; and
    if the matching entities are below the threshold level, determining that the additional content is not relevant to the context of the webpage and providing a lower ranking to the additional content.

11. The method of claim 1, further comprising:
    storing the additional content in a session datastore for the user, wherein the session datastore provides a snapshot of a current user session and identifies the additional content presented to the user in the side pane during the current user session;
    determining whether the request is for a newly accessed webpage;
    if the request is for a newly accessed webpage, performing the classification of the URL for the webpage; and
    if the request is from a user interaction in the side pane for the webpage, accessing the current user session for the webpage from the session datastore and sending different additional content to the browser to be presented in the side pane adjacent to the webpage.

12. The method of claim 11, further comprising:
    storing the user interaction as part of the current user session for the webpage in the session datastore, wherein the user interaction includes one or more of clicking on the additional content, scrolling up to a top portion of the side pane, or scrolling down to a bottom portion of the side pane.

13. The method of claim 1, wherein the one or more data sources include different data providers for different content and the one or more data sources include document indexes or content data stores.

14. The method of claim 1, wherein triggering the side pane experience for the additional content and aggregating the additional content for the side pane experience is performed by one or more machine learning models selecting a plurality of modules for presenting the additional content based on an identified domain for the webpage.

15. The method of claim 1, wherein triggering the side pane experience includes custom triggering based on partner services or rule-based triggering the side pane experience based on the classification of the URL matching a list of URLs or a list of domains, and the method further comprising:
    preventing triggering the side pane experience for the additional content in response to determining that the classification of the URL of the webpage is a private webpage.

16. The method of claim 1, wherein determining to deploy the overview type of module is based on determining whether the first portion of the additional content is useful to a user and determining an ability to generate the first portion of the additional content.

17. The method of claim 1, wherein the first portion of the additional content summarizes the webpage content.

18. The method of claim 1, wherein the first portion of the additional content includes a plurality of questions relevant to the webpage content, and answers provided by the webpage content.

19. A system, comprising:
    a memory to store data and instructions; and
    at least one processor operable to communicate with the memory, wherein the at least one processor is operable to:
    receive a request for additional content for a webpage, wherein the request includes a uniform resource locator (URL) of the webpage;
    classify the URL of the webpage;
    aggregate additional content, at least a portion of which is obtained from one or more data sources based on a context of the webpage;
    trigger a side pane experience including opening a side pane displaying one or more modules for presenting the additional content, the one or more modules having different module types each defining a different organization and presentation of at least a portion of the additional content;
    send the additional content to a browser to be presented in the one or more modules in the side pane adjacent to the webpage; and
    display an explore type of module that presents a first portion of the additional content which provides content recommendations related to the webpage content based at least in part on a user's past interactions with the browser.

20. The system of claim 19, wherein the at least one processor is further operable to classify the URL of the webpage by identifying a domain of the URL of the webpage and determining a classification of the URL of the webpage based on the domain.

21. The system of claim 19, wherein different modules are selected for different domains.

22. The system of claim 19, wherein the at least one processor is further operable to:
    perform a whole page optimization to organize the additional content for rendering in the side pane, wherein the whole page optimization includes applying a ranking to the additional content to determine an order for presenting the additional content in the side pane based on a relevancy of the additional content to the context of the webpage.

23. A computer-readable medium storing instructions executable by a computer device, comprising:
    at least one instruction for causing the computer device to receive a request for additional content for a webpage, wherein the request includes a uniform resource locator (URL) of the webpage;
    at least one instruction for causing the computer device to classify the URL of the webpage;
    at least one instruction for causing the computer device to aggregate additional content, at least a portion of which is obtained from one or more data sources based on a context of the webpage;
    at least one instruction for causing the computer device to trigger a side pane experience including opening a side pane displaying one or more modules for presenting the additional content, the one or more modules having different module types each defining a different organization and presentation of at least a portion of the additional content;
    at least one instruction for causing the computer device to send the additional content to a browser to be presented in the one or more modules in the side pane adjacent to the webpage; and
    at least one instruction for causing the computer device to display a source type of module that presents a first portion of the additional content that provides information about the source of the webpage.

* * * * *